US011236254B2

(12) United States Patent
Kosaka et al.

(10) Patent No.: US 11,236,254 B2
(45) Date of Patent: Feb. 1, 2022

(54) SEPARATOR

(71) Applicant: NITTO DENKO CORPORATION, Ibaraki (JP)

(72) Inventors: Naofumi Kosaka, Ibaraki (JP); Keisuke Shimokita, Toyohashi (JP); Hironao Ootake, Ibaraki (JP); Asami Doi, Ibaraki (JP); Mizuho Chiba, Ibaraki (JP); Akiko Takahashi, Toyohashi (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/343,351

(22) PCT Filed: Oct. 17, 2017

(86) PCT No.: PCT/JP2017/037464
§ 371 (c)(1),
(2) Date: Apr. 18, 2019

(87) PCT Pub. No.: WO2018/074447
PCT Pub. Date: Apr. 26, 2018

(65) Prior Publication Data
US 2019/0241769 A1 Aug. 8, 2019

(30) Foreign Application Priority Data

Oct. 18, 2016 (JP) .............................. JP2016-204641

(51) Int. Cl.
| | |
|---|---|
| *C09J 7/40* | (2018.01) |
| *B32B 5/18* | (2006.01) |
| *B32B 27/28* | (2006.01) |
| *B32B 27/34* | (2006.01) |
| *B32B 27/32* | (2006.01) |
| *C09J 7/20* | (2018.01) |
| *C09J 7/38* | (2018.01) |
| *C09J 201/04* | (2006.01) |
| *B32B 27/36* | (2006.01) |
| *B32B 27/00* | (2006.01) |
| *C09J 201/00* | (2006.01) |

(52) U.S. Cl.
CPC .............. *C09J 7/403* (2018.01); *B32B 5/18* (2013.01); *B32B 27/00* (2013.01); *B32B 27/281* (2013.01); *B32B 27/32* (2013.01); *B32B 27/34* (2013.01); *B32B 27/36* (2013.01); *C09J 7/20* (2018.01); *C09J 7/38* (2018.01); *C09J 201/00* (2013.01); *C09J 201/04* (2013.01); *C09J 2301/302* (2020.08); *Y10T 428/14* (2015.01); *Y10T 428/1457* (2015.01); *Y10T 428/1471* (2015.01); *Y10T 428/1476* (2015.01)

(58) Field of Classification Search
CPC ................. C09J 7/403; C09J 7/20; C09J 7/38
See application file for complete search history.

(56) References Cited

U.S. PATENT DOCUMENTS

| | | | | |
|---|---|---|---|---|
| 5,232,756 A | * | 8/1993 | Chang ...................... | C09J 7/403 428/41.5 |
| 5,851,617 A | * | 12/1998 | Keiser ........................ | C09J 7/26 428/41.8 |
| 2012/0258272 A1 | * | 10/2012 | Engelhard ................ | C09J 7/405 428/40.2 |

FOREIGN PATENT DOCUMENTS

| | | |
|---|---|---|
| EP | 2087995 A1 | 8/2009 |
| EP | 3363872 A1 | 8/2018 |
| JP | H01-118584 A | 5/1989 |
| JP | H7-506381 A | 7/1995 |
| JP | H9-227843 A | 9/1997 |
| JP | 2001139715 A * | 5/2001 |
| JP | 2001-279200 A | 10/2001 |
| JP | 2006-12998 A | 1/2006 |
| JP | 2008-162264 A | 7/2008 |
| JP | 2010-215900 A | 9/2010 |
| JP | 2011-16330 A | 1/2011 |
| WO | 93/012930 A1 | 7/1993 |
| WO | 2017/065275 A1 | 4/2017 |

OTHER PUBLICATIONS

Abstract of JP 2001-139715 A (Year: 1999).*
Office Action issued for corresponding Japanese Patent Application No. 2016-204641 dated Jul. 28, 2020, along with an machine English translation.
English translation of the International Search Report for corresponding international application PCT/JP2017/037464 dated Apr. 26, 2018, citing the above references.
The supplementary European Search Report and the European Search Opinion dated Mar. 27, 2020 in connection with the counterpart European Patent Application No. 17861234.7.

* cited by examiner

*Primary Examiner* — Anish P Desai
(74) *Attorney, Agent, or Firm* — Hauptman Ham, LLP

(57) ABSTRACT

A separator containing a substrate and a release layer formed on at least one side of the substrate wherein the separator shows a strain of not more than 7% when a load of 5N/20 mm is applied for one minute in the pulling direction, and when the substrate is cut in half in the thickness direction to divide the separator into two, an apparent elastic modulus in the pulling direction of one of the divided separators is larger than an apparent elastic modulus in the pulling direction of the other divided separator.

5 Claims, 8 Drawing Sheets

(a)

(b)

SEPARATOR

CROSS REFERENCE TO RELATED APPLICATION

This application claims the priority of Japanese Patent Application No. 2016-204641, filed on Oct. 18, 2016, in the JPO (Japanese Patent Office). Further, this application is the National Phase Application of International Application No. PCT/JP2017/037464, filed on Oct. 17, 2017, which designates the United States and was published in Japanese. Both of the priority documents are hereby incorporated by reference in their entireties.

TECHNICAL FIELD

The present invention relates to a separator used for protection and the like of an adhesive layer of an adhesive sheet.

BACKGROUND ART

Conventionally, adhesive sheets provided with position adjustment function are known (e.g., patent documents 1-3 etc.). In such adhesive sheets, non-adhesive or slightly-adhesive convex parts are partially provided on the surface of the adhesive layer (hereinafter "non-adhesive" and "slightly-adhesive" are collectively referred to as "low-adhesive"). When the adhesive sheet is placed on the surface of an adherend without pressing, the low-adhesive convex parts abuts against the surface of the adherend, and the adhesive layer hardly contacts the surface of the adherend. Thus, the adhesive sheet can be moved on the surface of the adherend, whereby the position adjustment of the adhesive sheet can be performed. After position adjustment, when the adhesive sheet is pressed, the low-adhesive convex parts are embedded in the adhesive layer, the adhesive layer contacts the adherend to express an adhesive force. As a result, the adhesive sheet can be adhered to the intended position on the adherend.

DOCUMENT LIST

Patent Documents patent document 1: JP-A-H01-118584
patent document 2: JP-A-2010-215900
patent document 3: JP-A-2001-279200

SUMMARY OF THE INVENTION

Problems to be Solved by the Invention

Generally, an adhesive layer of an adhesive sheet is often protected by being covered by a separator, which has a release layer of a release agent formed on at least one side of a film to be a substrate, until the adhesive sheet is actually adhered to an adherend. In this case, the adhesive sheet is formed into an adhesive sheet with a separator, in which a release layer of the separator is adhered to the adhesive layer thereof, wound around a core to give a roll (wound product) and then stored.

On the other hand, the separator is generally stored in the state of a roll in which the separator is wound around a core (hereinafter the roll is sometimes to be referred to as a "separator roll") until it is used by being superimposed on the adhesive sheet (adhered together), that is, until it is subjected to production of an adhesive sheet with a separator.

When the aforementioned adhesive sheet provided with the position adjustment function is adhered to the separator and wound in a roll and stored, a pressure due to tightening by winding is applied on the adhesive sheet, and a part of the low-adhesive convex part of the adhesive sheet is embedded in the adhesive layer, which in turn sometimes decreases the protrusion height of the convex part, or causes complete embedding of the convex part in the adhesive layer. Thus, the present inventors studied use of a separator having cushioning property by using a resin foam film and the like as a substrate.

When the adhesive sheet is wound up together with the separator having cushioning property into a roll, the adhesive sheet and the separator having cushioning property are laminated while being fed and wound around the core. In this case, the tension acting on the separator being fed causes expansion and/or contraction of the separator, thus resulting in breakage of the release layer of the separator. It was also found that the problem of breakage of the release layer may also occur during feeding of the separator when producing the separator roll.

Thus, the present inventors used, as a substrate of the separator, a porous film, such as a resin foam film, having a film with high elastic modulus laminated on both sides of the porous film and increased the elastic modulus in the pulling direction of the separator, whereby the above-mentioned problem of the destruction of the release layer could be solved. However, they encountered a new problem that, after storage of the roll of the adhesive sheet and the separator adhered thereto and wound together, when the adhesive sheet with separator is fed out from the roll, the separator contains many wrinkles. In addition, it was found that the problem of wrinkles may also occur in stored separator rolls.

The present invention has been made in view of the above-mentioned situation and the problem to be solved thereby is provision of a separator free of destruction of a release layer due to expansion and/or contraction of the substrate, and unsusceptible to wrinkles.

Means of Solving the Problems

The present inventors have conducted intensive studies and found that the above-mentioned problem is effectively solved by not only making the separator unsusceptible to expansion and/or contraction, but also making the elastic modulus of the separator different between one side and the other side in the thickness direction of the separator.

The present invention based on such finding is as follows.
[1] A separator comprising a substrate and a release layer formed on at least one side of the substrate, wherein
the separator shows a strain of not more than 7% when a load of 5N/20 mm is applied for one minute in the pulling direction, and
when the aforementioned substrate is cut in half in the thickness direction to divide the separator into two, an apparent elastic modulus (E1) in the pulling direction of one of the divided separators is larger than an apparent elastic modulus (E2) in the pulling direction of the other divided separator.
[2] The separator of [1], which satisfies $E1 \geq 1.4 \times E2$.
[3] The separator of [1] or [2], wherein E2 is not less than 0.5 MPa.

[4] The separator of any one of [1] to [3], which satisfies E1≤1000×E2.

The separator of any one of [1] to [4], wherein the substrate comprises a porous film.

[6] The separator of any one of [1] to [4], wherein the substrate comprises a porous film, and a solid film or skin layer laminated on both sides or one side of the porous film.

[7] The separator of [5] or [6], wherein the porous film has a density of 10-200 kg/m³.

[8] The separator of any one of [5] to [7], wherein the porous film is a polyolefin foam, a polyester foam, a polyurethane foam or a rubber foam.

[9] The separator of any one of [6] to [8], wherein the solid film comprises one or more kinds of resins selected from the group consisting of polyester, polyamide, polyvinyl chloride, polyvinyl acetate, polyvinylidene chloride, polyolefin, polyimide, fluororesin, cellophane and ionomer resin.

[10] The separator of any one of [1] to [9], wherein the release layer comprises a silicone release agent.

[11] The separator of any one of [1] to [10], wherein the compressive elastic modulus is not more than 1 MPa.

[12] The separator of any one of [1] to [11], which is for an adhesive sheet provided with a position adjustment function and comprising an adhesive layer and a low-adhesive convex part partially formed on a surface of the adhesive layer.

[13] A method for producing a separator roll, comprising a step of winding up a separator around a core, wherein the separator comprises a substrate and a release layer formed on at least one side of the substrate, wherein the separator shows a strain of not more than 7% when a load of 5N/20 mm is applied for one minute in the pulling direction, and when the aforementioned substrate is cut in half in the thickness direction to divide the separator into two, an apparent elastic modulus (E1) in the pulling direction of one of the divided separators is larger than an apparent elastic modulus (E2) in the pulling direction of the other divided separator.

[14] The method of [13], which satisfies E1≥1.4×E2.

[15] The method of [13] or [14], wherein E2 is not less than 0.5 MPa.

[16] The method of any one of [13] to [15], which satisfies E1≤1000×E2.

[17] The method of any one of [13] to [16], wherein the substrate comprises a porous film.

[18] The method of any one of [13] to [16], wherein the substrate comprises a porous film, and a solid film or skin layer laminated on both sides or one side of the porous film.

[19] The method of [17] or [18], wherein the porous film is a porous film with a density of 10-200 kg/m³.

[20] The method of any one of [17] to [19], wherein the porous film is a polyolefin foam, a polyester foam, a polyurethane foam or a rubber foam.

[21] The method of any one of [18] to [20], wherein the solid film comprises one or more kinds of resins selected from the group consisting of polyester, polyamide, polyvinyl chloride, polyvinyl acetate, polyvinylidene chloride, polyolefin, polyimide, fluororesin, cellophane and ionomer resin.

[22] The method of any one of [13] to [21], wherein the release layer comprises a silicone release agent.

[23] The method of any one of [13] to [22], wherein the separator has a compressive elastic modulus of not more than 1 MPa.

Effect of the Invention

According to the present invention, a separator suppressing destruction of release layer and occurrence of wrinkles at high levels can be realized.

DESCRIPTION OF EMBODIMENTS

The present invention is more specifically explained in the following by referring to preferable embodiments thereof.

In the present specification, the range of numerical values defined using a symbol "-" includes numerical values on both ends (upper limit and the lower limit) of "-". For example, "0.01-5" shows not less than 0.01 and not more than 5.

Figure 1:
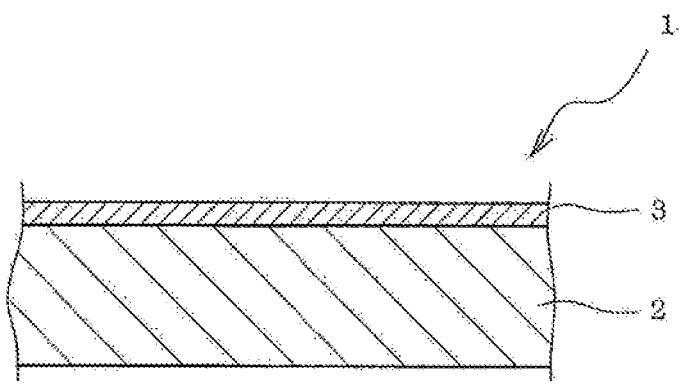
FIG. 1 is a schematic cross sectional view of the separator of one embodiment of the present invention.

FIG. 1 is a schematic cross sectional view of a separator of one embodiment of the present invention. In FIG. 1, the dimensional ratio between respective parts of the separator does not necessarily match the dimensional ratio between respective parts of the actual separator.

The separator of the present invention has, as shown in the separator 1 of the one embodiment, a substrate 2 and a release layer 3 formed on at least one side of the substrate 2.

The separator of the present invention is characterized firstly in that it shows a strain of not more than 7%, which is produced in the separator when a load of 5N/20 mm is applied for one minute in the pulling direction of the separator (hereinafter this strain is sometimes to be abbreviated as "pulling direction strain").

As used herein, the "pulling direction" is a direction parallel to a flat plane perpendicular to the thickness direction of the substrate 2.

When the separator shows a strain of not more than 7% when a load of 5N/20 mm is applied for one minute in the pulling direction of the separator, expansion and/or contraction of the separator to be fed when obtaining a roll obtained by adhering the separator to an adhesive sheet and winding same by roll-to-roll (a roll of adhesive sheet with a separator) can be sufficiently suppressed, and destruction of the release layer can be prevented. In addition, expansion and/or contraction of the separator to be fed can be sufficiently suppressed and destruction of the release layer can be prevented when producing the separator roll.

The separator of the present invention preferably shows the above-mentioned pulling direction strain of not more than 5%, more preferably not more than 4%.

A strain produced when a load of 5N/20 mm is applied for one minute in the pulling direction of the separator is adopted in the present invention because the tension applied to the separator and the time necessary for the strain at the tension to be stabilized are considered in the production step of the roll of the adhesive sheet with the separator and the production step of the separator roll.

Figure 2:
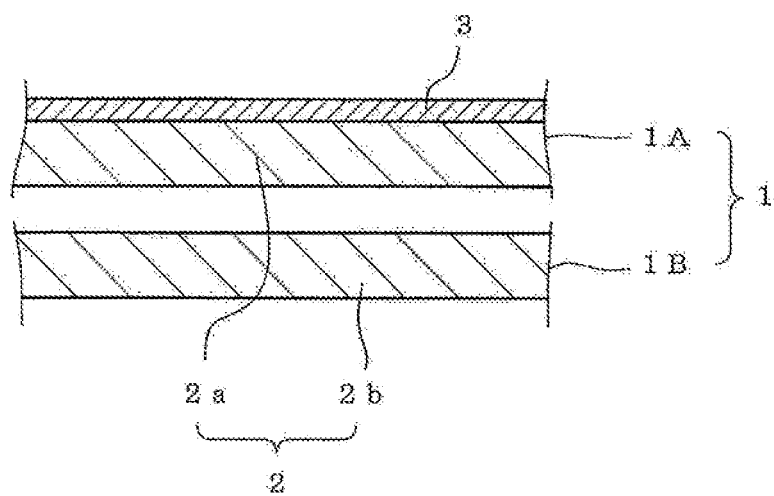
FIG. 2 is a schematic cross sectional view of two divided separators obtained by cutting the separator of FIG. 1 in the thickness direction of the substrate.

FIG. 2 shows two divided separators obtained by cutting the separator 1 of FIG. 1 in the thickness direction of the substrate (separator divided into two parts). In FIG. 2, the dimensional ratio between respective parts of the separator (separator divided into two parts) does not necessarily match the dimensional ratio between respective parts of the actual separator.

As shown in FIG. 2, the separator of the present invention has a second characteristic that, when the substrate 1 is cut in half in the thickness direction to divide the separator 1 into two, an apparent elastic modulus (E1) in the pulling direction of one of the divided separators 1A is larger than an apparent elastic modulus (E2) in the pulling direction of the other divided separator 1B; (E1>E2). That is, the elastic modulus in the pulling direction is different between one side and the other side (one surface side and the other surface side) in the thickness direction of the separator.

As used herein, "the substrate is cut in half in the thickness direction to divide the separator into two" means cutting substrate 2 into two films 2a, 2b of approximately half the thickness of the substrate 2 to divide the separator 1 into two. The two films 2a, 2b of approximately half the thickness of the substrate 2 mean that one film and the other film each have a thickness in the range of (T/2−0.1T)-(T/2+0.1T) throughout the film, wherein the thickness of the substrate 2 is T. The "pulling direction of the divided separator" is a direction parallel to a plane perpendicular to the thickness direction of the films 2a, 2b obtained by cutting the substrate 2.

In the separator 1 of one embodiment, as shown in FIG. 2, one divided separator 1A has a release layer 3, the other divided separator 1B does not have the release layer 3. In the present invention, the presence or absence of the release layer in the divided separators is not related to the large/small relation of the elastic moduluses of the two divided separators. That is, in the two divided separators, the apparent elastic modulus of the divided separator free of the release layer may be larger than the apparent elastic modulus of the divided separator having the release layer, or the apparent elastic modulus of the divided separator free of the release layer may be smaller than the apparent elastic modulus of the divided separator having the release layer. This is because the release layer does not substantially affect the elastic modulus in the pulling direction of the separator.

The separator of the present invention having such second characteristic affords a separator that resists occurrence of wrinkles. This is assumed to be attributable to the second characteristic, i.e., the different elastic modulus in pulling the separator at one side and the other side in the thickness direction of the separator, because the difference in the elastic modulus between one side and the other side in the thickness direction reduces the difference in tension between the inner circumference side and the outer circumference side that acts on the separator being wound up into a roll (wound-up product), and consequently suppresses occurrence of wrinkles.

To further enhance the effect of suppressing occurrence of wrinkles in the separator of the present invention, the apparent elastic modulus (E1) in the pulling direction of the one divided separator 1A is preferably not less than 1.4 times the apparent elastic modulus (E2) in the pulling direction of the other divided separator 1B; (E1≥1.4×E2). It is more preferably not less than 2.5 times (E1≥2.5×E2), and particularly preferably not less than 2.8 times (E1≥2.8×E2). When the apparent elastic modulus (E1) in the pulling direction of one of the divided separators 1A is too larger than the apparent elastic modulus (E2) in the pulling direction of the other divided separator 1B, there is a risk of unwinding due to repulsive force after being wound in a roll. Thus, the elastic modulus (E1) is preferably not more than 1000 times the elastic modulus (E2) (E1≤1000×E2), more preferably not more than 200 times (E1≤200×E2), further preferably not more than 50 times (E1≤50×E2), further more preferably not more than 15 times (E1≤15×E2), and particularly preferably not more than 10 times (E1≤10×E2).

In the present invention, the apparent elastic modulus (E2) in the pulling direction of the divided separator having a lower apparent elastic modulus in the pulling direction is not less than 0.5 MPa, more preferably not less than 1 MPa, from the viewpoint of securing the strength that prevents breakage of the separator when it is peeled from the adhesive sheet.

The separator of the present invention can be used as a separator for protecting an adhesive layer of various adhesive sheets. Preferable specific examples of the adhesive sheet to which the separator of the present invention is applied include an adhesive sheet provided with a position adjustment function. The adhesive sheet provided with a position adjustment function is described below.

Figure 5:
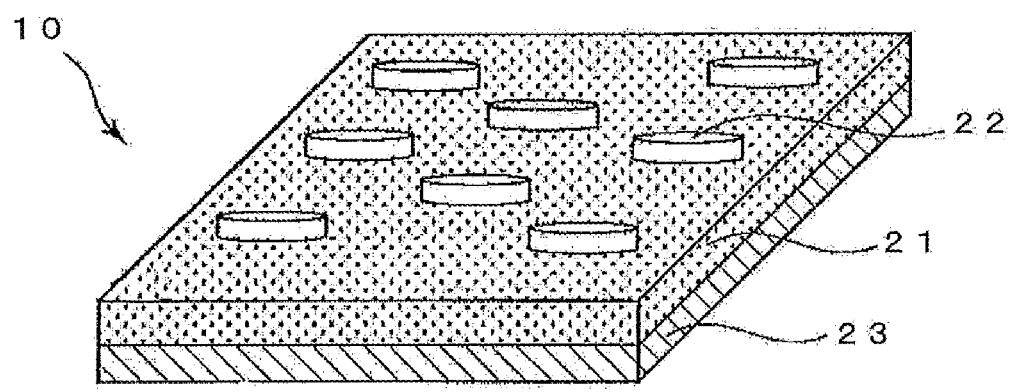
FIG. 5 is a schematic perspective view of one embodiment of the adhesive sheet provided with the position adjustment function.
Figure 6:
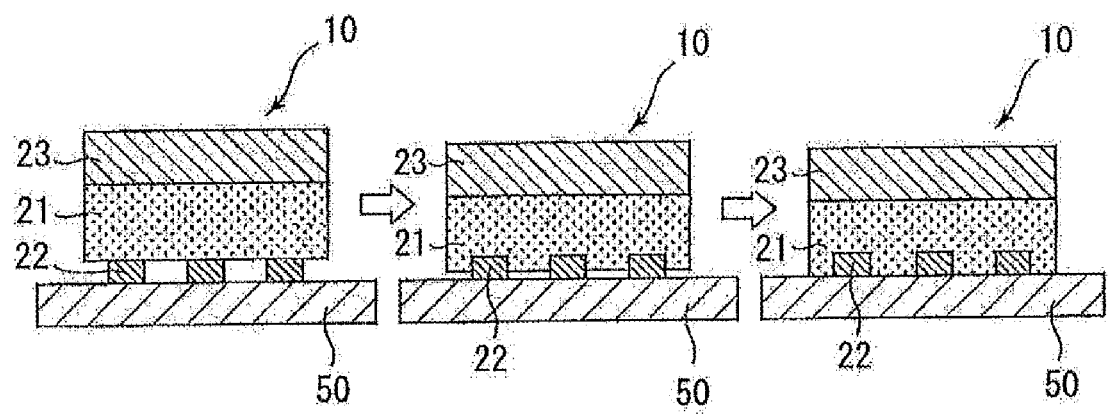
FIGS. 6(A), 6(B) and 6(C) are schematic cross-sectional views of changes in the adhesive sheet provided with a position adjustment function during an operation to apply the sheet to the adherend.

FIG. 5 is a schematic perspective view of one embodiment of the adhesive sheet provided with the position adjustment function. The adhesive sheet 10 provided with the position adjustment function contains the adhesive layer 11 and the low-adhesive convex part 22 partially formed on the surface of the adhesive layer 21. Symbol 23 in the Figure is a support. In the present invention, "low-adhesive" of the "low-adhesive convex part" means nonadhesive (without tackiness) or lower tackiness of the convex part 22 than the adhesive layer 21. FIGS. 6(A), 6(B) and 6(C) are schematic cross-sectional views of the adhesive sheet and the adherend, which explains changes in the adhesive sheet 10 of FIG. 5 during an operation to apply the sheet to the adherend 50. The adhesive sheet provided with the position adjustment function has low-adhesive convex parts 22 (hereinafter "low-adhesive convex parts" is to be also abbreviated simply as "convex parts") partially formed on the surface of the adhesive layer 21. Therefore, when the adhesive sheet 10 is placed on the surface of the adherend 50 (state free of pressurization), as shown in FIG. 6(A), the low-adhesive convex parts 22 abut the adherend 50, and the adhesive layer 21 can easily move on the surface of the adherend 50 since the adhesive layer 21 does not substantially contact the adherend 50. When the adhesive sheet 10 placed on the surface of the adherend 50 is pressed with a weak pressure, as shown in FIG. 6(B), low-adhesive convex parts 2 are partly embedded in the adhesive layer 21. Thus, the adherend 50 contacts a part of the adhesive layer 21 while the low-adhesive convex parts 22 are exposed from the surface of the adhesive layer 21 (in FIG. 6(B), the contact region between adhesive layer 21 and adherend 50 is not shown). As a result, the adhesive sheet adheres to the adherend 50 with a low adhesive force. Therefore, after the adhesive sheet 10 is temporarily fixed to the adherend 50 by pressing same with a weak pressure (after the adhesive sheet is adhered with a low adhesive force), the adhesive sheet 10 can be easily detached from the adherend 50. After detachment, low-adhesive convex parts 22 are exposed and the adhesive sheet 10 can be comparatively easily moved on the surface of the adherend 50. FIG. 6(C) shows the state when the adhesive sheet 10 is adhered to the adherend 50 by applying a sufficient pressure on the adhesive sheet 10 placed on the surface of the adherend 50. As shown in FIG. 6(C), due to the sufficient pressure applied to the adhesive sheet 10, the whole low-adhesive convex parts 22 are embedded in the adhesive layer 21 and the adhesive sheet 10 is adhered to the adherend 50 with a sufficient adhesive force. Thus, the position of the adhesive sheet 10 provided with the position adjustment function can be easily adjusted on the adherend 50 until the adhesion position on the adherend 50 is finally determined and, after completion of the positional adjustment, the adhesive sheet can be adhered to the adherend with the sufficient adhesive force.

Various materials such as resin (natural resin, synthetic resin), rubber, paper, metal, a composite material of two or more kinds selected from the group consisting of these and the like can be applied to the substrate 2 of the separator 1 of the present invention, according to the use of the adhesive sheet to which the separator is applied, shape of the adhesive layer and the like. In addition, in the separator 1 of the present invention, at least a part of the substrate 2 is preferably constituted of a porous film from the aspect of imparting cushioning property to the separator. The substrate 2 may be a single layer structure or a multi layer structure, and a multi layer structure is preferable since the separator having the above-mentioned second characteristic can be prepared easily.

Figure 3:
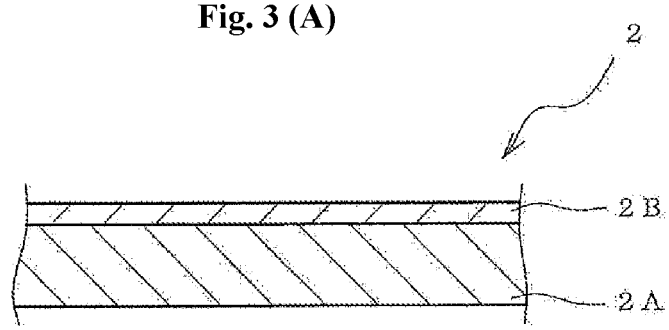
FIGS. 3(A) and 3(B) show a schematic cross sectional view of the substrate with a two-layered structure (FIG. 3(A)) and a schematic cross sectional view of the substrate with a three-layer structure (FIG. 3(B)) in the separator of the present invention.
Figure 3:
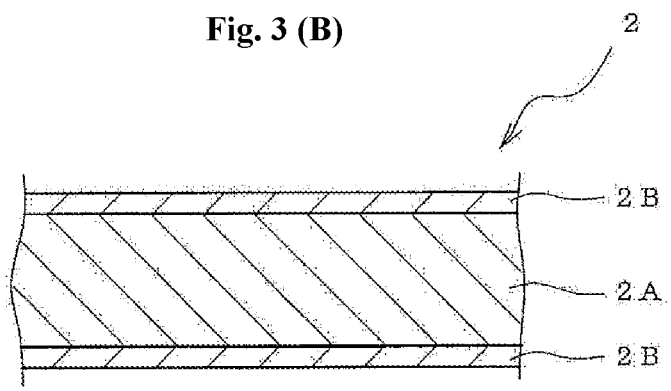

When the substrate 2 is a multi layer structure, a two-layer structure in which a thin layer 2B is formed on one side of a main layer 2A (FIG. 3(A)) or a three-layer structure in which a thin layer 2B is formed on both sides of the main layer 2A (FIG. 3(B)) is preferable, and the two-layer structure is more preferable. In the case of the two-layer structure or the three-layer structure, the main layer 2A is preferably made of a porous film. In the case of the three-layer structure, the separator having the above-mentioned second characteristic is easily obtained by changing the constituting materials, thickness and the like of the two thin layers 2B to be formed on both sides of the main layer 2A.

As the porous film to be applied to the main layer 2A, (1) a film obtained by a mechanical perforation treatment of a solid film comprising, as a component, one or more kinds of resins selected from the group consisting of polyester (e.g., poly(ethylene terephthalate) (PET) etc.), nylon, saran (trade name), polyvinyl chloride, polyethylene, polypropylene, ethylene-vinyl acetate copolymer, polytetrafluoroethylene, and ionomer; (2) resin foam film of polyolefin foam (e.g., foam comprising, as a component, noncrosslinked polyethylene foam, crosslinked polyethylene foam, polypropylene foam, polyethylene (PE) and polypropylene (PP) etc.), polyester foam (e.g., poly(ethylene terephthalate) foam, etc.), urethane foam (e.g., soft urethane foam, hard urethane foam, urethane modified polyisocyanurate foam, polyisocyanurate foam etc.) and the like; (3) rubber foam film and the like such as vulcanized rubber foam film containing, as a rubber component, one or more kinds of rubbers selected from the group consisting of ethylene•propylene•diene rubber (EPDM), ethylene•propylene rubber, ethylene•propylene terpolymer, silicone-based rubber, fluorine-based rubber, acrylic rubber, polyurethane-based rubber, polyamide-based rubber, natural rubber, chloroprene rubber, butyl rubber, nitrile butyl rubber, styrene•butadiene rubber, styrene•butadiene•styrene rubber, styrene•isoprene•styrene rubber, styrene•ethylene•butadiene rubber, styrene•ethylene•butylene•styrene rubber, and styrene•isoprene•propylene•styrene rubber can be mentioned. Also, (4) paper, woven fabric, non-woven fabric (e.g., polyester (e.g., poly(ethylene terephthalate) (PET) etc.) non-woven fabric etc.) and the like are also encompassed in the porous film.

As the resin foam film and rubber foam film, commercially available products can be used. As the rubber foam film, for example, a mixture of rubber, a vulcanization agent, azodicarbonamide, a urea-based foaming aid and a process oil having a kinematic viscosity at 40° C. of 1-1000 mm$^2$/sec and a flash point of not more than 200° C., which is described in JP-A-2001-139715, or a rubber foam film which is a vulcanization foamed molded body of a mixture containing a vulcanization agent, azodicarbonamide, a urea foaming aid, a process oil having a kinematic viscosity at 40° C. of 1-1000 mm$^2$/sec and a flash point of not more than 200° C. and, as necessary, non-rubber polymer such as acrylic polymer such as polyalkyl (meth)acrylate, polyvinyl chloride, polyethylene, polypropylene, ethylene•vinyl acetate copolymer, polyvinyl acetate, polyamide, polyester, chlorinated polyethylene, urethane polymer, styrene polymer, silicone polymer, epoxide-based resin and the like can be used.

As a more preferable embodiment of substrate 2, the two-layer structure shown in FIG. 3(A) or the three-layer structure shown in FIG. 3(B), in which the resin foam film of the above-mentioned (2) or the rubber foam film of the above-mentioned (3) is used as a porous film constituting the main layer 2A, and a solid film formed from one or more kinds of resins selected from the group consisting of polyester (e.g., poly(ethylene terephthalate) (PET), poly(ethylene naphthalate) (PEN) etc.); polyamide (e.g., nylon etc.); polyvinyl chloride (PVC); polyvinyl acetate (PVAc); polyvinylidene chloride; polyolefin (e.g., polyethylene (high density polyethylene, low density polyethylene), polypropylene, reactor TPO, ethylene•propylene copolymer, ethylene-vinyl acetate copolymer (EVA) etc.); polyimide (PI); fluororesin (e.g., polytetrafluoroethylene etc.); cellophane and ionomer resin (e.g., resin obtained by crosslinking a polymer having polyethylene unit (E) and acrylic acid unit (A) with a metal (M) etc.) is used as the thin layer 2B, can be mentioned. The solid film is preferably a polyolefin solid film, more preferably a high density polyethylene solid film or a low density polyethylene solid film. A skin layer can be applied to thin layer 2B instead of a solid film. The skin layer is a thin layer obtained by processing a predetermined thickness portion of the surface of a resin foam film or a rubber foam film to an opening ratio smaller than the opening ratio of a film other than the predetermined thickness portion, which is formed on the surface of a resin foam film of the above-mentioned (2) or a rubber foam film of the above-mentioned (3), which is a porous film constituting the main layer 2A. The "pore ratio" is an area ratio of fine pores in the area of the thin film in the flat plane perpendicular to the thickness direction of the resin foam film or rubber foam film. The pore ratio of the skin layer is preferably not more than 10%, more preferably not more than 5%, from the aspects of maintenance of the cushioning property of the resin foam film or rubber foam film.

The skin layer is generally formed by melting the predetermined thickness portion of the surface of a resin foam film or a rubber foam film. For example, a skin layer can be formed on the side of a surface to be in contact with a heating roll of the film by using a heating roll set to a temperature about 5-20° C. lower than the melting point of the film and reducing the rotating speed of the heating roll to a level lower than the running speed of the film.

The thickness of the main layer 2A of such two-layer structure or three-layer structure is preferably not less than 100 μm, more preferably not less than 200 μm, further more preferably not less than 500 μm. In addition, it is preferably not more than 5000 μm, more preferably not more than 1500 μm, further more preferably not more than 1000 μm. The thickness of the thin layer 2B is preferably not more than 200 μm, more preferably not more than 80 μm, further more preferably not more than 20 μm. In addition, it is preferably not less than 1 μm, more preferably not less than 3 μm, further more preferably not less than 5 μm.

Figure 4:
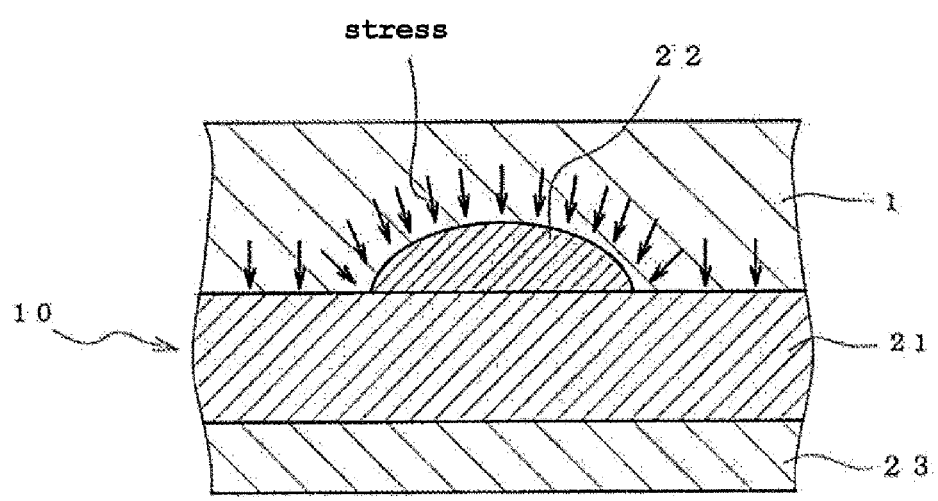
FIG. 4 is a schematic cross-sectional view of the essential part showing a state in which the separator of the present invention is superimposed on the surface of the adhesive layer of the adhesive sheet provided with the position adjustment function.

When the separator of the present invention 1 is used as the separator of the adhesive sheet provided with the position adjustment function, the compressive elastic modulus of the separator is preferably not more than 1 MPa. When separator 1 covering the surface of the adhesive layer 21 of the adhesive sheet 10 provided with the position adjustment function has the compressive elastic modulus of not more than 1 MPa, even when the separator 1 is wound together with the adhesive sheet 10 and stored as rolls and the pressure due to the winding tightening is applied to the adhesive sheet 10, as shown in FIG. 4, concentration of stress to the low-adhesive convex parts 22 formed on the surface of the adhesive layer 21 is reduced by the separator 1. Therefore, crushing of the convex parts 22 and embedding thereof in the adhesive layer 21 to markedly decrease the protrusion height of the convex parts 22 can be prevented. The compressive elastic modulus of the separator 1 is more preferably not more than 0.7 MPa, particularly preferably not more than 0.5 MPa.

In the adhesive sheet 10 provided with a position adjustment function, to ensure good adhesiveness of the adhesive sheet during temporary fixation of the adhesive sheet to the adherend and adhesion (main bonding) of the adhesive sheet to the adherend by pressurizing the adhesive sheet, the protrusion height of the low-adhesive convex part 22 is preferably not more than 200 μm. Thus, when the separator of the present invention 1 is used as a separator of an adhesive sheet provided with a position adjustment function, it preferably has a compressive elastic modulus of not more than 1 MPa, and a compressive stress of not more than 0.1 MPa upon 200 μm compression and a compressive stress of not more than 0.05 MPa at a deformation amount of 200 μm during compression recovery after the compression. When the compressive stress on application of the compression amount and deformation amount on compression recovery of the separator 1 to the maximum protrusion height (200 μm) within the preferable range of the protrusion height of the low-adhesive convex part 22 is sufficiently small and the protrusion height of the low-adhesive convex part 22 is not more than 200 μm, the stress that acts on the low-adhesive convex part 22 due to the pressure from the winding tightening of the adhesive sheet is sufficiently reduced and crushing of the convex part 22 and embedding of the convex part 22 in the adhesive layer 21 can be prevented at a higher level.

The compressive elastic modulus of the separator, the compressive stress upon 200 μm compression, and the compressive stress (compressive stress on 200 μm recovery) at a deformation amount of 200 μm during compression recovery can be measured using the compressive force measurement function of a precision measurement device (Autograph) manufactured by Shimadzu Corporation, in which compressive stress is measured by pressing the indenter against the central part of the separator (4 cm×4 cm) in the direction perpendicular to the release treatment surface at temperature: 23° C., indenter area: 1 cm², compression speed: 1 mm/min, after reaching the target stress of 0.1 MPa, compression recovery is performed by moving the cylindrical indenter at a speed of 1 mm/min in the pulling direction.

The porous film (resin foam film, rubber foam film etc.) constituting the main layer 2A preferably has an apparent density measured according to JIS K 7222 (2005) of not more than 500 kg/m³, more preferably not more than 200 kg/m³, further more preferably not more than 100 kg/m³. When the porous film (resin foam film, rubber foam film etc.) has such apparent density, (a) the release liner having a compressive elastic modulus of not more than 1 MPa, (b) the release liner having a compressive elastic modulus of not more than 1 MPa, a compressive stress of not more than 0.1 MPa upon 200 μm compression, and a compressive stress of not more than 0.05 MPa at a deformation amount of 200 μm during compression recovery after the compression are easily obtained. The apparent density of the porous film (resin foam film, rubber foam film etc.) is preferably not less than 1 kg/m³, more preferably not less than 10 kg/m³, to impart elasticity to prevent crushing of convex parts 22 and embedding of convex parts 22 into adhesive layer 21.

In addition, a porous film (resin foam film, rubber foam film etc.) constituting the main layer 2A having an average major diameter of fine pores within the range of 10-1000 μm and an average minor diameter within the range of 10-1000 μm is preferably used. In addition, the hole area rate (when the foam film has a predetermined thickness portion on its surface processed into a skin layer, the "hole area rate" as used herein refers to the opening ratio of the portion other than the predetermined thickness portion (skin layer) of the surface of the foam film) of the resin foam film, rubber foam film and the like is preferably 50-99%, more preferably 60-98%, from the aspect of flexibility.

The substrate 2 composed of the two-layer structure in which the thin layer 2B is formed on one side of the main layer 2A (FIG. 3(A)) or the three-layer structure in which the thin layer 2B is formed on both sides of the main layer 2A (FIG. 3(B)) is produced by laminating a solid film to be the thin layer 2B on one side or both sides of a resin foam film or a rubber foam film to be the main layer 2A according to, for example, a conventional production method of a laminate film such as heat pressing by a heat press machine, roll-to-roll continuous heat lamination processing and the like.

The release layer 3 formed on at least one side of the substrate 2 in the separator of the present invention is not particularly limited and may be, for example, a release layer formed from a known release agent such as fluorine release agent, long chain alkyl acrylate release agent, silicone release agent and the like. Of these, a release layer formed from a silicone-based release agent is preferable. As the curing method of the release agent, a curing method such as UV irradiation, electron beam irradiation and the like are preferably used. Furthermore, of the silicone-based release agents, a cation polymerizable UV curable silicone-based release agent is preferable. A cation polymerizable UV curable silicone-based release agent is a mixture of a cation polymerizable silicone (polyorganosiloxane having an epoxy functional group in a molecule) and an onium salt photoinitiator. Such agent wherein the onium salt photoinitiator is a boron photoinitiator is particularly preferable. Using such a cation polymerizable UV curable silicone-based release agent wherein the onium salt photoinitiator is a boron photoinitiator, particularly good releaseability (mold releaseability) can be obtained. A cation polymerizable silicone (polyorganosiloxane having an epoxy functional group in a molecule) has at least two epoxy functional groups in one molecule, which may be linear or branched chain, or a mixture of these. While the kind of an epoxy functional group contained in polyorganosiloxane is not particularly limited, it only needs to permit progress of cationic ring-opening polymerization by an onium salt photoinitiator. Specific examples thereof include γ-glycidyloxypropyl group, β-(3,4-epoxycyclohexyl)ethyl group, β-(4-methyl-3,4-epoxycyclohexyl)propyl group and the like. Such cation polymerizable silicone (polyorganosiloxane having an epoxy functional group in a molecule) is marketed and a commercially available product can be used. For example, UV9315, UV9430, UV9300, TPR6500, TPR6501 and the like manufactured by Toshiba Silicone Co., Ltd., X-62-7622, X-62-7629, X-62-7655, X-62-7660, X-62-7634A and the like manufactured by Shin-Etsu Chemical Co., Ltd., Poly200, Poly201, RCA200, RCA250, RCA251 and the like manufactured by Arakawa Chemical Industries, Ltd. can be mentioned.

As the silicone-based release agent, a thermosetting addition type silicone-based release agent (thermosetting addition type polysiloxane-based release agent) can also be used. The thermosetting addition type silicone-based release agent contains, as essential constituent components, polyorganosiloxane containing an alkenyl group as a functional group in a molecule (alkenyl group containing silicone) and polyorganosiloxane containing a hydrosilyl group as a functional group in a molecule.

As the above-mentioned polyorganosiloxane containing an alkenyl group as a functional group in a molecule, among others, polyorganosiloxane having two or more alkenyl groups in a molecule is preferable. Examples of the above-mentioned alkenyl group include vinyl group (ethenyl group), allyl group (2-propenyl group), butenyl group, pentenyl group, hexenyl group and the like. The above-mentioned alkenyl group is generally bonded to a silicon atom (e.g., terminal silicon atom, silicon atom in the main chain etc.) of polyorganosiloxane forming the main chain or skeleton.

Examples of the above-mentioned polyorganosiloxane forming the main chain or skeleton include polyalkylalkylsiloxane (polydialkylsiloxane) such as polydimethylsiloxane, polydiethylsiloxane, polymethylethylsiloxane and the like, polyalkylarylsiloxane, a copolymer using plural kinds of silicon atom-containing monomer components [e.g., poly(dimethylsiloxane-diethylsiloxane) etc.] and the like. Of these, polydimethylsiloxane is preferable. That is, as polyorganosiloxane containing an alkenyl group as a functional group in a molecule, specifically, polydimethylsiloxane having vinyl group, hexenyl group and the like as functional groups is preferably recited as an example.

The above-mentioned polyorganosiloxane crosslinking agent containing a hydrosilyl group as a functional group in a molecule is polyorganosiloxane having a hydrogen atom bonded to silicon atom (particularly, silicon atom having Si—H bond) in a molecule, and polyorganosiloxane having two or more silicon atoms having Si—H bond in a molecule is particularly preferable. The above-mentioned silicon atom having Si—H bond may be any of a silicon atom in the main chain and a silicon atom in the side chain. That is, it may be contained as a constituent unit of the main chain or may be contained as a constituent unit of the side chain. The number of the silicon atom having Si—H bond is not particularly limited as long as it is two or more. The above-mentioned polyorganosiloxane crosslinking agent containing a hydrosilyl group as a functional group in a molecule is specifically preferably polymethylhydrogensiloxane, poly(dimethylsiloxane-methylhydrogensiloxane) or the like.

The thermosetting silicone-based release agent may contain, together with the aforementioned thermosetting silicone-based resin, a reaction inhibitor (reaction retardant) to impart preservation stability at room temperature. Specific examples of the reaction inhibitor include 3,5-dimethyl-1-hexyn-3-ol, 3-methyl-1-penten-3-ol, 3-methyl-3-penten-1-yne, 3,5-dimethyl-3-hexen-1-yne and the like when thermosetting addition type silicone-based release agent is used as a release agent.

The thermosetting silicone-based release agent may further contain a release control agent and the like as necessary besides the above-mentioned components. Specifically, a release control agent such as MQ resin and the like, polyorganosiloxane free of alkenyl group or hydrosilyl group (trimethylsiloxy group terminated polydimethylsiloxane etc.) and the like may be added. The content of these components in the release agent is not particularly limited, and 1-30 wt % of the whole solid content is preferable.

The thermosetting silicone-based release agent generally contains a curing catalyst. As the curing catalyst, a platinum catalyst generally used as a catalyst for thermosetting addition type silicone is preferably used. Among others, at least one platinum catalyst selected from chloroplatinic acid, olefin complex of platinum and olefin complex of chloroplatinic acid is preferable. The curing catalyst can be used as it is or after dissolving or dispersing in a solvent.

The amount (solid content) of the curing catalyst is preferably 0.05-0.55 parts by weight, more preferably 0.06-0.50 parts by weight, per 100 parts by weight (resin content) of the thermosetting silicone-based resin. When the amount of the aforementioned curing catalyst is less than 0.05 parts by weight, the curing rate becomes slow, and when it exceeds 0.55 parts by weight, the pot life becomes markedly short.

In the present invention, a coating solution containing a release agent used for forming the release layer generally contains an organic solvent to improve coatability. The organic solvent is not particularly limited and, for example, aliphatic or alicyclic hydrocarbon solvents such as cyclohexane, hexane, heptane and the like; aromatic hydrocarbon solvents such as toluene, xylene and the like; ester solvents such as ethyl acetate, methyl acetate and the like; ketone solvents such as acetone, methylethyl ketone and the like; alcohol solvents such as methanol, ethanol, butanol and the like, and the like can be used. These organic solvents may be used singly or a mixture of two or more kinds thereof may be used.

In the separator of the present invention, the thickness of the release layer 3 is preferably 0.001-10 µm, more preferably 0.03-5 µm, particularly preferably 0.1-1 µm, from the aspects of superior releasability (mold releasability) and suppression of uneven thickness (stable formation of the release layer).

The separator of the present invention is stored as a roll in which the separator is wound around a core until it is actually used for protection of an adhesive layer of an adhesive sheet. The separator roll is generally produced by roll-to-roll. That is, the separator roll is produced by forming the release layer by the release agent on at least one side of the film while feeding the film drawn from the roll of the film to be the substrate (that is, application and drying of a coating solution containing a release agent is performed), and winding the film (separator), on which the releasing layer is formed, around the core by a winding device. While the outer diameter of the core is not particularly limited, it is generally about 1-3 inches; while the separator winding tension is not particularly limited, it is generally about 30-200N/600 mm; while the winding speed is not particularly limited, it is generally about 30 to 100 m/min.

The adhesive sheet provided with the position adjustment function is described in detail in the following.

The adhesive layer 21 of the adhesive sheet 10 provided with the position adjustment function is a pressure-sensitive adhesive layer containing a pressure-sensitive adhesive as a main component. The pressure-sensitive adhesive (hereinafter to be simply abbreviated as "adhesive") is not particularly limited and, for example, rubber adhesive, acrylic adhesive, polyamide adhesive, silicone adhesive, polyester adhesive, ethylene-vinyl acetate copolymer adhesive, urethane adhesive and the like can be mentioned based on the kind of the base polymer constituting the adhesive. It can be appropriately selected from these known adhesives. Of these, acrylic adhesives are superior in various properties such as heat resistance, weatherability and the like, and a desired property can be expressed by selecting the kind and the like of the monomer component constituting the acrylic polymer. Thus, they can be used preferably.

Acrylic adhesives are generally formed from a base polymer constituted of alkyl (meth)acrylate as a main monomer component. Examples of alkyl (meth)acrylate include (meth)acrylic acid $C_{1-20}$ alkyl ester (preferably (meth) acrylic acid $C_{2-12}$ alkyl ester, further preferably (meth) acrylic acid $C_{2-8}$ alkyl ester) such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, octadecyl (meth)acrylate, nonadecyl (meth)acrylate, eicosyl (meth)acrylate and the like, and the like. One or more kinds of alkyl (meth)acrylates can be selected and used. In the present specification, "(meth)acryl" means "acryl" and "methacryl".

Where necessary, an acrylic polymer may contain a unit corresponding to other monomer component copolymerizable with alkyl (meth)acrylate with the aim to improve cohesion strength, heat resistance, crosslinking property and the like. Examples of such monomer component include carboxyl group-containing monomers such as acrylic acid, methacrylic acid, carboxyethyl acrylate, carboxypentyl acrylate, itaconic acid, maleic acid, fumaric acid, crotonic acid and the like; hydroxyl group-containing monomers such as hydroxybutyl (meth)acrylate, hydroxyhexyl (meth)acrylate, hydroxyoctyl (meth)acrylate, hydroxydecyl (meth)acrylate, hydroxylauryl (meth)acrylate, (4-hydroxymethylcyclohexyl)methyl methacrylate and the like; sulfonic acid group-containing monomers such as styrene sulfonic acid, ally sulfonic acid, 2-(meth)acrylamido-2-methylpropanesulfonic acid, (meth)acrylamidopropanesulfonic acid, sulfopropyl (meth)acrylate, (meth)acryloyloxynaphthalenesulfonic acid and the like; phosphate group-containing monomers such as 2-hydroxyethylacryloyl phosphate and the like; (N-substituted)amide monomers such as (meth)acrylamide, N,N-dimethyl(meth)acrylamide, N-butyl(meth)acrylamide, N-methylol(meth)acrylamide, N-methylolpropane(meth) acrylamide and the like; aminoalkyl (meth)acrylate monomers such as aminoethyl (meth)acrylate, N,N-dimethylaminoethyl (meth)acrylate, t-butylaminoethyl (meth)acrylate and the like; alkoxyalkyl (meth)acrylate monomer; maleimide monomers such as N-cyclohexylmaleimide, N-isopropylmaleimide, N-lauryl maleimide, N-phenylmaleimide and the like; itaconimide monomers such as N-methylitaconimide, N-ethylitaconimide, N-butylitaconimide, N-octylitaconimide, N-2-ethylhexylitaconimide, N-cyclohexylitaconimide, N-laurylitaconimide and the like; succinimide monomers such as N-(meth) acryloyloxymethylenesuccinimide, N-(meth)acryloyl-6-oxyhexamethylenesuccinimide, N-(meth)acryloyl-8-oxyoctamethylenesuccinimide and the like; vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, N-vinylcaprolactam and the like; cyanoacrylate monomers such as acrylonitrile, methacrylonitrile and the like; epoxy group-containing acrylic monomers such as glycidyl (meth)acrylate and the like; glycol acrylate monomers such as polypropylene glycol (meth)acrylate, methoxyethyl glycol (meth)acrylate, methoxypolypropylene glycol (meth)acrylate and the like; acrylate monomers having heterocycle, halogen atom, silicon atom and the like such as tetrahydrofurfuryl (meth)acrylate, fluorine (meth) acrylate, silicone (meth)acrylate and the like; multifunctional monomers such as hexanediol di(meth)acrylate, (poly)ethylene glycol di(meth)acrylate, polypropylene glycol di(meth)acrylate, neopentylglycol di(meth)acrylate, pentaerythritol di(meth)acrylate, trimethylolpropane tri(meth) acrylate, pentaerythritol tri(meth)acrylate, dipentaerythritol hexa(meth)acrylate, epoxy acrylate, polyester acrylate, urethane acrylate, divinylbenzene, butyl di(meth)acrylate, hexyl di(meth)acrylate and the like; olefin monomers such as isoprene, dibutadiene, isobutylene and the like; vinyl ether monomers such as vinyl ether and the like, and the like. One or more kinds of these monomer components can be used.

Acrylic copolymer can be produced by subjecting the aforementioned alkyl (meth)acrylate and other monomer as necessary to polymerization by a known appropriate method. The molecular weight and the like of the acrylic copolymer are not particularly limited and, for example, one having a weight average molecular weight of 100000-2000000, preferably 150000-1000000, further preferably 300000-1000000 can be used.

The adhesive may be a hydrophilic adhesive using a polymer having an acidic group such as carboxyl group and the like as a base polymer and having hydrophilicity imparted by entirely or partially neutralizing the acidic group in the base polymer by adding a neutralizing agent. Hydrophilic adhesive generally causes less adhesive residue on the adherend and even when an adhesive residue is produced, it can be removed with ease by washing with pure water.

The polymer having an acidic group can be obtained by copolymerizing a monomer having an acidic group such as the aforementioned carboxyl group-containing monomer and the like during preparation of the base polymer.

Examples of the neutralizing agent include organic amino compounds with alkalinity such as primary amine (e.g., monoethylamine, monoethanolamine and the like), secondary amine (e.g., diethylamine, diethanolamine and the like), tertiary amine (e.g., triethylamine, triethanolamine, N,N,N'-trimethylethylenediamine, N-methyldiethanolamine, N,N-diethylhydroxylamine and the like), and the like.

The adhesive may contain a crosslinking agent as necessary.

As the crosslinking agent, crosslinking agents such as epoxy-based crosslinking agent, isocyanate-based crosslinking agent, melamine-based crosslinking agent, peroxide-based crosslinking agent, metal alkoxide-based crosslinking agent, metal chelate-based crosslinking agent, metal salt-based crosslinking agent, carbodiimide-based crosslinking agent, oxazoline-based crosslinking agent, aziridine-based crosslinking agent, amine-based crosslinking agent and the like can be used, and epoxy-based crosslinking agent, isocyanate-based crosslinking agent and the like can be preferably used. These may be used alone or two or more kinds thereof may be used in combination.

Examples of the epoxy-based crosslinking agent include N,N,N',N'-tetraglycidyl-m-xylenediamine, diglycidyl aniline, 1,3-bis(N,N-diglycidyl aminomethyl)cyclohexane, 1,6-hexanediol diglycidyl ether, neopentylglycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, diglycidyl adipate, diglycidyl o-phthalate, triglycidyl-tris(2-hydroxyethyl)isocyanurate, resorcin diglycidyl ether, bisphenol S diglycidyl ether, epoxy resin containing two or more epoxy groups in a molecule and the like.

Examples of the isocyanate-based crosslinking agent include lower aliphatic polyisocyanates such as 1,2-ethylene diisocyanate, 1,4-butylene diisocyanate, 1,6-hexamethylene diisocyanate and the like; aliphatic polyisocyanates such as cyclopentylene diisocyanate, cyclohexylene diisocyanate, isophorone diisocyanate, hydrogenated tolylene diisocyanate, hydrogenated xylene diisocyanate and the like; aromatic polyisocyanates such as 2,4-tolylene diisocyanate, 2,6-tolylene diisocyanate, 4,4'-diphenylmethane diisocyanate, xylylene diisocyanate and the like, and the like.

The adhesive layer 21 may contain additives such as plasticizer, stabilizer, filler lubricant, colorant, ultraviolet absorber, antioxidant, colorant and the like.

The adhesive layer 21 preferably has an elastic modulus of 0.01-10 MPa, more preferably 0.1-10 MPa, to express sufficient tackiness.

As mentioned above, the adhesive sheet 10 with the position adjustment function has a constituent in which the low-adhesive convex parts 22 are embedded in the adhesive layer 21 upon pressurization, and the adhesive layer 21 contacts the adherend 50 to express adhesive force. Therefore, the relationship between the elastic modulus of the adhesive layer 21 and the elastic modulus of the low-adhesive convex part 22 is important. As mentioned below, for the low-adhesive convex parts 22 to exhibit the position adjustment function, it should be free of deformation when it is in contact with the adherend, and therefore, it has an elastic modulus of not less than 0.1 MPa. When the adhesive layer 21 has the elastic modulus of 0.01-10 MPa, good results in the position adjustment function and the adhesiveness can be obtained while maintaining the balance with the elastic modulus (not less than 0.1 MPa) of the low-adhesive convex part 22. The elastic modulus of the adhesive layer of the adhesive sheet is measured by the following method.

While the thickness of the adhesive layer 21 is not particularly limited, it is preferably 10-1000 μm, more preferably 50-500 μm, particularly preferably 70-250 μm. When the thickness of the adhesive layer is within the above-mentioned preferable range, the adhesive sheet after position adjustment can be adhered to the adherend by pressurization adhesion with a sufficient adhesive force while maintaining the position adjustment function of the low-adhesive convex parts 22.

Figure 7:
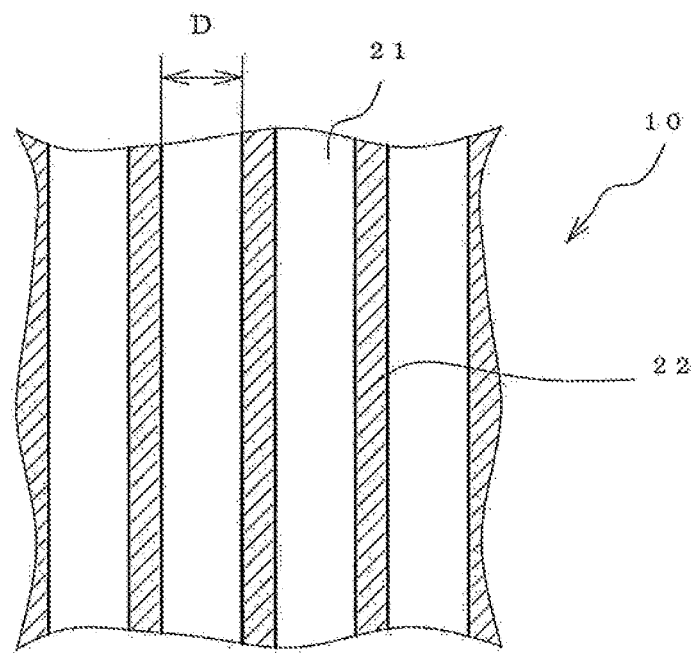
FIG. 7 is a plan view of the adhesive sheet provided with the position adjustment function in which low-adhesive convex parts are formed in a stripe manner on the adhesive layer surface.
Figure 8:
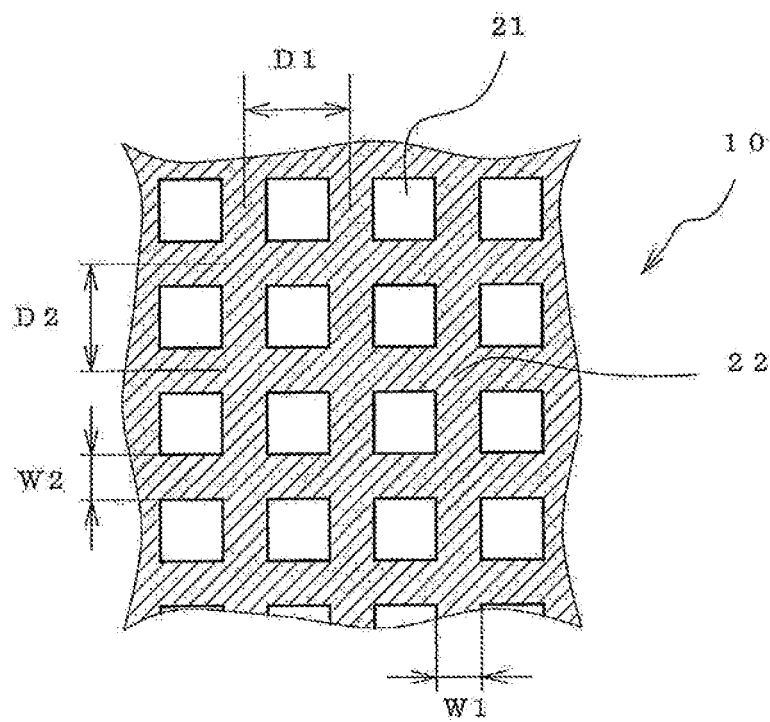
FIG. 8 is a plan view of the adhesive sheet provided with the position adjustment function in which low-adhesive convex parts are formed in a grid manner on the adhesive layer surface.

In the adhesive sheet 10 with the position adjustment function shown in FIG. 5, a low-adhesive convex parts 22 is formed in a dot-like manner on the surface of the adhesive layer 21. FIGS. 7, 8 are flat plane views of the essential parts of other embodiments of the adhesive sheet with the position adjust function. In these embodiments, the low-adhesive convex parts 22 are each formed as stripe-like or grid-like. In the adhesive sheet 10 with the position adjust function, the low-adhesive convex parts 22 may be formed in the same pattern on the whole surface of the adhesive layer 21. While the shape of the pattern is not particularly limited, dot-shape, stripe-shape, grid-shape, net-shape and the like are preferable from the aspects of easy pattern formation. As used herein, the "grid-shape" and "net-shape" are different in that the "grid-shape" has a pattern of convex parts in which the planar shape of the pore portion (the portion where the convex parts are not present) is a square or a rectangle, and the "net-shape" has a pattern of convex parts in which the planar shape of the pore portion (the portion where the convex parts are not present) is a shape other than square or rectangle. When the convex parts are net-shape, the shape of the pore portion (the portion where the convex parts are not present) may be entirely the same or different for each pore portion, with preference given to the entirety being the same.

When the convex parts has a dot-like pattern, the planar shape of each dot (convex part) may be various shapes such as triangle, rectangle (e.g., square, rectangle, diamond shape, trapezoid etc.), circular shape (e.g., true circle, circle close to true circle, ellipse etc.), oval, regular polygon (square etc.), star shape and the like, and the arrangement form of the dots is not particularly limited, and square matrix, staggered pattern and the like are preferable. In the adhesive sheet 10 of the first embodiment (FIG. 5), dots (convex parts 22) having a circular shape in a plane are arranged in a staggered pattern.

When the convex parts 22 are in a dot-like pattern, the flat plane area of the dot (convex parts 22) is preferably 0.007-20 mm², more preferably 0.2-1.8 mm². The flat plane area of the dot (convex part 22) may be the same for all dots (convex parts 22) or difficult for each dot (convex part 22). Preferably, all dots (convex parts 22) have the same area. The pitch (distance between center points) between the adjacent dots (convex parts 22) is preferably 0.1-5 mm, more preferably 0.2-2 mm.

Figure 9:
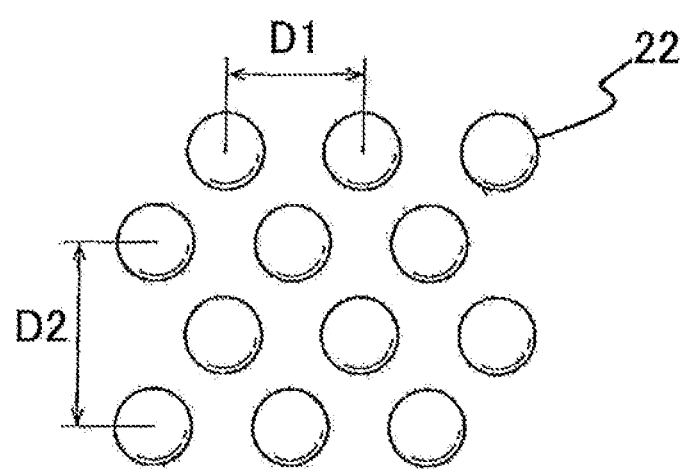
FIG. 9 is a flat plane view of a state where the low-adhesive dot-like convex parts of the adhesive sheet provided with the position adjustment function are arranged in a staggered manner.

When the dots (convex parts 22) are arranged in staggered pattern (FIG. 9), the pitch between dots (convex parts 22) is shown by D1 and D2 in FIG. 9.

When the convex parts 22 are in a stripe-like pattern, the width of each line part (convex parts) is preferably 0.1-5 mm, more preferably 0.2-2 mm. The width (D in FIG. 7) of the space part between adjacent line parts (convex parts) is preferably 0.1-5 mm, more preferably 0.2-2 mm.

When the convex parts 22 are in a grid-like pattern, the width (W1, W2 in FIG. 8) of the vertical line and the horizontal line (convex parts) is preferably 0.1-5 mm, more preferably 0.2-2 mm, for each. The pitch (distance between axis lines (D1, D2 in FIG. 8)) between the adjacent vertical and horizontal line parts (convex parts) is preferably 0.1-5 mm, more preferably 0.2-2 mm, for each.

The flat plane area, width and the like of the above-mentioned convex part 12 refer to the maximum area of the convex part 12 and the maximum width of the convex part 12 when the surface of the adhesive layer 11 is vertically viewed from above the surface of the adhesive layer 11. In addition, the tip of the above-mentioned convex part 12 to be in contact with the adherend 3 may be a flat surface or a non-flat surface.

The protrusion height of the low-adhesive convex parts 22 from the surface of the adhesive layer 21 is preferably not more than 200 μm, more preferably not more than 150 μm, particularly preferably not more than 130 μm. Preferably, it is not less than 1 μm, more preferably not less than 10 μm. When the protrusion height exceeds 200 μm, the adhesiveness and adhesive force of the adhesive sheet may be insufficient and when the protrusion height is less than 1 μm, the position adjustment function of the low-adhesive convex parts 22 may be insufficient.

The protrusion height of the convex parts 22 is preferably 3-100%, more preferably 10-100%, of the thickness of the adhesive layer 21, with the thickness of the adhesive layer 21 as the standard. When the protrusion height of the convex parts 22 is less than 3% of the protrusion height of the adhesive layer 21, the position adjustment function of the adhesive sheet may be insufficient and, conversely, when the thickness of the convex parts exceeds 100% of the thickness of the adhesive layer, the adhesiveness and adhesive force of the adhesive sheet may be insufficient.

The occupancy rate of the low-adhesive convex parts 22 on the surface of the adhesive layer 21 ([total area of convex parts 22/total area of surface of adhesive layer]×100(%)) is preferably 30-90%, more preferably 40-80%, from the aspects of the adhesiveness and the low friction property of the adhesive sheet 1 (that is, easy mobility on the adherend).

The constituent materials of the low-adhesive convex parts 22 can be selected according to the kind of the adhesive constituting the adhesive layer 21. That is, any can be used as long as it is non-adhesive (free of tackiness) or has lower tackiness than the adhesive layer 21, insoluble in the adhesive layer 21, and has shape retention property. Examples thereof include inorganic materials such as glass powder, glass fiber, silica bead, aluminum oxide bead, metal fiber, metal net and the like, organic materials such as synthetic resin bead, synthetic resin balloon, natural fiber, synthetic resin fiber, natural resin and/or synthetic resin molding (thread, net, grid) and the like, or a pressure-sensitive adhesive (e.g., rubber, acrylic, ethylene-vinyl acetate copolymer etc.) having lower tackiness than the adhesive layer 21 and the like. One or more kinds of the constituent materials of the low-adhesive convex parts 22 can be used.

That the constituent material of the low-adhesive convex part 22 has lower tackiness than the adhesive layer 21 means that the elastic modulus of the constituent material of the low-adhesive convex part 22 measured by a nano indenter is greater than the elastic modulus of the adhesive layer 21.

For the low-adhesive convex part 22 to exhibit a stable position adjustment function, it is important that the part does not easily deform (=low tackiness) when it is in contact with the adherend. For this end, the convex part 22 preferably has an elastic modulus of not less than 0.1 MPa, furthermore preferably not less than 5 MPa. The elastic modulus of the convex part 22 is measured by the following method.

<Measurement Method of Elastic Modulus of Adhesive Layer 21 and Convex Part 22>

Figure 10:
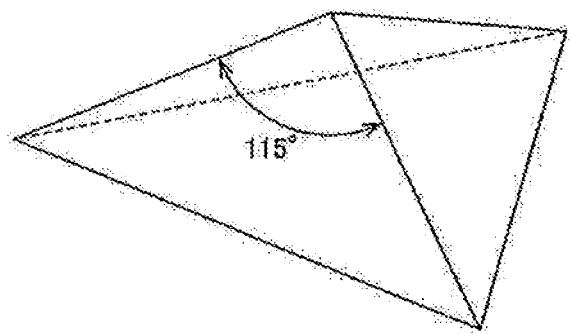
FIG. 10 is a drawing explaining a measurement method of the elastic modulus of the adhesive layer and low-adhesive convex part.
Figure 10:
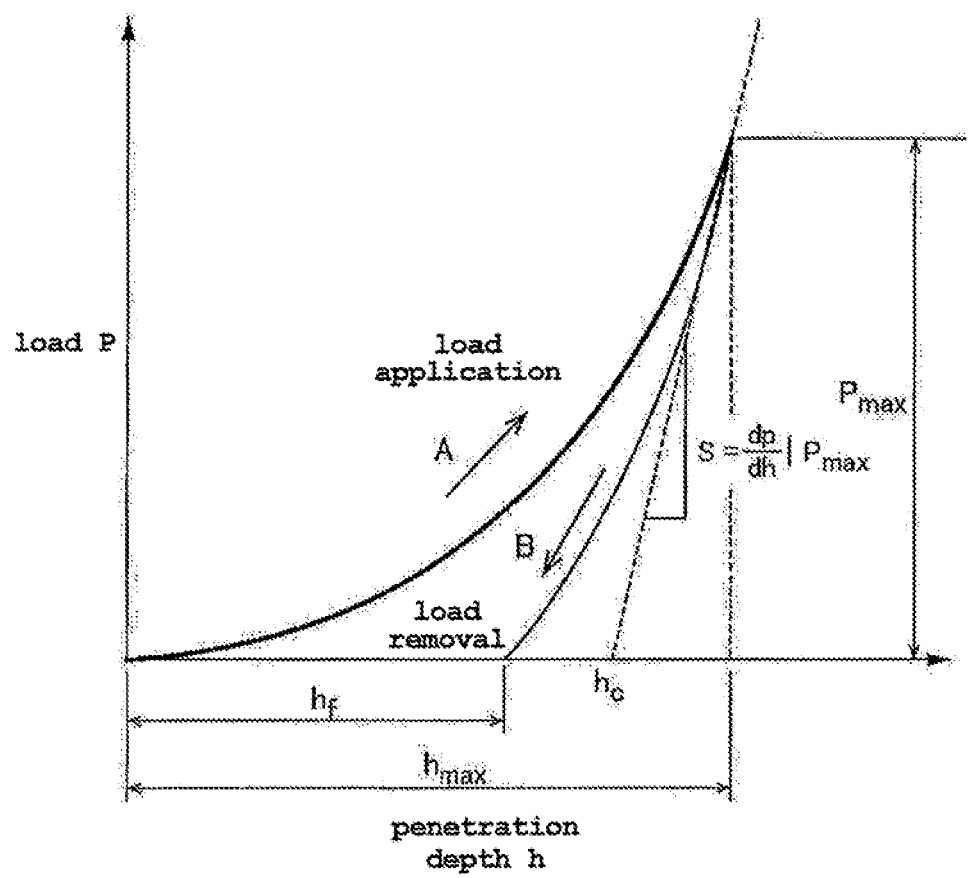

The measurement method of the elastic modulus of adhesive layer 21 and convex part 22 is explained by referring to FIG. 10.

The elastic modulus here is a composite elastic modulus obtained by a nano indentation test using a nano indenter "TriboScope" manufactured by HYSITRON. The nano indentation test is a test for measuring elastic properties of a test sample from the relationship between load P and penetration depth h of the indenter, which is obtained in the process of gradually pushing a Berkovich indenter (triangular pyramidal diamond indenter) into the test sample until a predetermined maximum load Pmax is reached by applying a load P (hereinafter loading process), the process of maintaining at the maximum load Pmax for a given time (hereinafter maintenance process), and the process of, after maintenance, gradually unloading and withdrawing until the load P becomes 0 (hereinafter unloading process). The penetration depth h means a distance between the tip of the indenter and the surface of a test material in an initial state (surface of test material before pushing in the indenter), and corresponds to the amount of displacement of the indenter from the position of initial contact of the indenter with the surface of the test material.

The elastic modulus of the convex part 22 and the adhesive layer 21 can be calculated from the following formula (1) based on the relationship between load P and penetration depth h of the indenter which is obtained by the above-mentioned nano indentation test.

$$Er = 1/\beta \cdot S/2 \cdot (\pi/A)^{1/2} \quad (1)$$

In the above-mentioned formula (1), Er is elastic modulus, β is constant determined by indenter shape, and β=1.034 is used for Berkovich indenter. S is contact rigidity modulus, n is circular constant, and A is contact projection area of indenter and surface of the test material.

The elastic modulus of an adhesive layer can be measured by contacting the indenter with the surface of an adhesive layer of the test material (adhesive sheet). The elastic modulus of the convex part is measured by, for example, cutting out a convex part alone on the adhesive sheet from the adhesive layer in an environment of −100° C. or below by using an ultramicrotome equipped with a diamond blade to remove an influence of the adhesive layer, fixing same on a given sample table (made of SUS), and contacting the indenter on the surface of the convex part.

(Contact Rigidity Modulus)

The above-mentioned contact rigidity modulus S is calculated based on the relationship between load P and depth of penetration h of the indenter, which is obtained in the above-mentioned nano indentation test, particularly, the relationship obtained in the unloading process. In a more specific explanation, contact rigidity modulus S is defined by the inclination of an unloading curve immediately after transition to the unloading process, after the position of the indenter reached the maximum depth of penetration hmax (depth of penetration when maximum load Pmax is applied) and after the maintenance process. In other words, the contact rigidity modulus S means the gradient (dP/dh) of the tangent line L to the unloading curve at a point (hmax, Pmax).

(Contact Projection Area)

The above-mentioned contact projection area A means the area obtained by projecting the area of contact part between the indenter and the surface of a test material when the position of the indenter reached the maximum penetration depth hmax, in the pushing-in direction of the indenter. When the depth of the contact part (contact depth) is hc, the contact projection area A can be approximated by the following formula (2) in the case of Berkovich indenter.

$$A = 24.56 \cdot hc^2 \quad (2)$$

The above-mentioned contact depth hc is shown by the following formula (3) and using maximum penetration depth hmax, maximum load Pmax and contact rigidity modulus S.

$$hc = hmax - 0.75 \cdot Pmax/S \quad (3)$$

In the nano indentation test in the present invention, measurement and analysis of elastic modulus are performed using measurement-analysis software TriboScanVer.8.0.0.4 manufactured by Hysitron.

Figure 11:
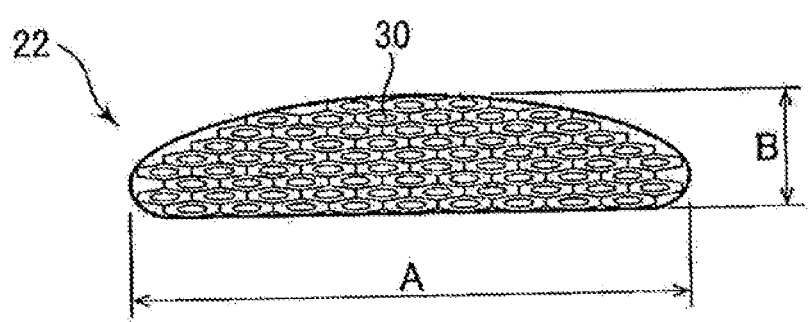
FIG. 11 is a schematic side view of a low-adhesive convex part composed of an aggregate of a plurality of cohesive particles.

(Measurement Condition)

penetration rate in loading-unloading processes 200 μN/sec retention time 15 sec maximum penetration depth (depth of penetration on transition to unloading process) 0.9-5 μm One preferable embodiment of the low-adhesive convex part 22 is, for example, a convex part composed of an aggregate of a plurality of cohesive particles. FIG. 11 is a schematic side view of a convex part 22 composed of an aggregate of a plurality of cohesive particles 30. The aggregate of a plurality of cohesive particles 30 (convex part 22) has a curved surface as the top surface and is a flat body with a circular planar shape. The cohesive particle means a particle having a given cohesion force, and can also be grasped as an aggregate of particles. Examples of the plurality of cohesive particles 30 include polymer particle group derived from polymer emulsion, and the polymer particle group derived from polymer emulsion includes a polymer particle group composed of particles with a single polymer composition, and/or a polymer particle group composed of core-shell structure polymer particles with different polymer composition between core and shell. In the following description, particle with a single polymer composition is also referred to as "non-core-shell structure polymer particle". Since the polymer particle group derived from polymer emulsion has a cohesive force by itself, it does not always require an additive. However, the cohesion force of the polymer particle group may be enhanced by adding an additive such as epoxy-based crosslinking agent, silane coupling agent and the like to, for example, the polymer emulsion as long as the property of the convex parts 22 is not influenced.

The polymer emulsion from which the polymer particle group is derived is obtained by emulsion polymerization, that is, by polymerization of monomer emulsion. The monomer component in the polymer emulsion (that is, monomer constituting monomer emulsion) preferably contains alkyl acrylate and/or alkyl methacrylate. As the alkyl acrylate, one or more kinds selected from ethyl acrylate, propyl acrylate, n-butyl acrylate, t-butyl acrylate, n-hexyl acrylate, cyclohexyl acrylate, 2-ethylhexyl acrylate, n-octyl acrylate, and lauryl acrylate is preferable. As the alkyl methacrylate, one or more kinds selected from methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, and isobornyl methacrylate are preferable. In addition, carboxyl group-containing monomers such as acrylic acid, methacrylic acid, carboxyethyl acrylate, carboxypentyl acrylate, itaconic acid, maleic acid, fumaric acid, crotonic acid and the like, and hydroxyl group-containing monomers such as hydroxybutyl (meth) acrylate, hydroxyhexyl (meth)acrylate, hydroxyoctyl (meth) acrylate, hydroxydecyl (meth)acrylate, hydroxylauryl (meth)acrylate, (4-hydroxymethylcyclohexyl)methyl methacrylate and the like can be contained. One or more kinds of carboxyl group-containing monomer and hydroxyl group-containing monomer can be respectively used.

The core-shell structure polymer particle group is preferably composed of core-shell structure polymer particles having a higher elastic modulus of the shell than that of the core, and preferably composed of core-shell structure polymer particles having a core-shell structure in which the weight of the core to the weight of the shell is not more than 80% (preferably not more than 80% and not less than 10%). By setting the elastic modulus of the shell higher than the elastic modulus of the core, the frictional force of the core-shell structure polymer particles becomes small. Therefore, when the low-adhesive convex part 22 is constituted of a polymer particle group composed of core-shell structure polymer particles having an elastic modulus of the shell set higher than the elastic modulus of the core, the low-adhesive convex part 22 becomes low frictional, which in turn improves the position adjustment function of the low-adhesive convex part 22 and affords an appropriate elastic modulus in relation to the adhesive layer 21.

Figure 12:
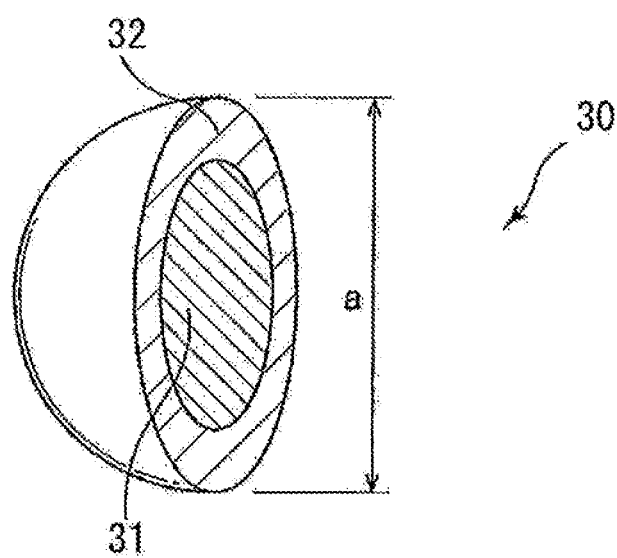
FIG. 12 is a cross-sectional perspective view showing the core-shell structure polymer particles constituting the low-adhesive convex part.

FIG. 12 is a sectional perspective view showing the core-shell structure polymer particles 30 constituting the core-shell structure polymer particle group. In individual core-shell structure polymer particle 30, core 31 is preferably constituted of acrylic polymer (A1) containing alkyl acrylate as the main monomer component, and shell 32 is preferably constituted of acrylic polymer (A2) containing alkyl acrylate and alkyl methacrylate as the main monomer components. The core-shell structure polymer particles 30 constituting the core-shell structure polymer particle group are approximately spherical, and the average particle size "a" thereof can be appropriately changed in consideration of the maximum diameter "A" and height "B" of the convex part 22 (see FIG. 11). For example, the particle size of the core-shell structure polymer particles 30 in consideration of the maximum diameter "A" and height "B" of the convex part 22 is preferably not less than 100 nm, more preferably not less than 120 nm, from the aspects of the viscosity of the water dispersion liquid (polymer emulsion), and preferably not more than 300 nm, more preferably not more than 200 nm, from the aspects of cohesion of the particles after drying (that is, after removal of water from water dispersion liquid (polymer emulsion)). In this case, the maximum diameter "A" of the convex part 22 is preferably not less than 100 μm, more preferably not less than 250 μm, from the aspect of the stability of the shape of the convex part, and preferably not more than 3 mm, more preferably not more than 2 mm, from the aspect of the adhesive force of the adhesive sheet. The height "B" is preferably not less than 1 μm, more preferably not less than 10 μm, from the aspect of the stability of the position adjustment function, and preferably not more than 100 μm, more preferably not more than 80 μm, from the aspect of the adhesive force.

<Core>

Acrylic polymer (A1) containing alkyl acrylate as the main monomer component and constituting core 31 is preferably a homopolymer of butyl acrylate (BA) (=n-butyl acrylate) or a copolymer in which alkyl acrylate other than butyl acrylate (BA) and alkyl methacrylate are copolymerized with butyl acrylate (BA).

Preferable examples of the alkyl acrylate other than butyl acrylate (BA) include ethyl acrylate, propyl acrylate, t-butyl acrylate, n-hexyl acrylate, cyclohexyl acrylate, 2-ethylhexyl acrylate, n-octyl acrylate, lauryl acrylate and the like, and one or more kinds of alkyl acrylate can be used in combination. Of these, alkyl acrylate containing an alkyl group having a carbon number of 3-9 such as propyl acrylate, 2-ethylhexyl acrylate, n-octyl acrylate and the like is preferable. Alkyl methacrylate is a component copolymerized mainly for the purpose of controlling elastic modulus of the polymer, and alkyl methacrylate containing an alkyl group having a carbon number of 1-18 (e.g., methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, isobornyl methacrylate etc.) is preferably used. Of these, methyl methacrylate, ethyl methacrylate, cyclohexyl methacrylate and the like are preferable. One alkyl methacrylate can be used or two or more kinds thereof can be used in combination.

Acrylic polymer (A1) preferably contains 60-100 wt %, more preferably 70-99.9 wt %, further preferably 80-99 wt %, particularly preferably 80-98 wt %, of alkyl acrylate in all monomer components.

In addition, acrylic polymer (A1) may be copolymerized with a carboxyl group-containing monomer and a hydroxyl group-containing monomer to improve adhesiveness of an adhesive and impart stability to an emulsion. Examples of the carboxyl group-containing monomer include acrylic acid, methacrylic acid, carboxyethyl acrylate, carboxypentyl acrylate, itaconic acid, maleic acid, fumaric acid, crotonic acid and the like. Examples of the hydroxyl group-containing monomer include hydroxybutyl (meth)acrylate, hydroxyhexyl (meth)acrylate, hydroxyoctyl (meth)acrylate, hydroxydecyl (meth)acrylate, hydroxylauryl (meth)acrylate, (4-hydroxymethylcyclohexyl)methyl methacrylate and the like. The carboxyl group-containing monomer and/or hydroxyl group-containing monomer are/is preferably contained in an amount of 0.1-8 wt %, more preferably 1-7 wt %, further preferably 2-5 wt %, of all monomer components constituting acrylic polymer (A1).

<Shell>

Acrylic polymer (A2) containing alkyl acrylate and alkyl methacrylate as the main monomer components and constituting the shell preferably contains alkyl methacrylate in an amount of 30-95 wt %, more preferably 35-90 wt %, particularly preferably 40-80 wt %, of all monomer components. As alkyl methacrylate, alkyl methacrylate containing an alkyl group having a carbon number of 1-18 (e.g., methyl methacrylate (MMA), ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, isobornyl methacrylate etc.) is preferably used. Of these, methyl methacrylate (MMA), ethyl methacrylate, t-butyl methacrylate, isobornyl methacrylate and the like are preferable and methyl methacrylate (MMA) is particularly preferable.

In acrylic polymer (A2), alkyl acrylate is a component copolymerized mainly for the purpose of controlling elastic modulus of the polymer, and alkyl acrylate containing an alkyl group having a carbon number of 1-18 is preferable. Alkyl acrylate can be used singly or in combination of two or more kinds thereof. Specific examples of alkyl acrylate containing an alkyl group having a carbon number of 1-18 include methyl acrylate, ethyl acrylate, propyl acrylate, butyl acrylate (BA)(=n-butyl acrylate), t-butyl acrylate, n-hexyl acrylate, cyclohexyl acrylate, 2-ethylhexyl acrylate, n-octyl acrylate, lauryl acrylate, isobornyl acrylate and the like. Of these, alkyl acrylates containing an alkyl group having a carbon number of 3-9 such as propyl acrylate, butyl acrylate (BA), 2-ethylhexyl acrylate, n-octyl acrylate and the like are preferable, and butyl acrylate (BA) is particularly preferable.

In addition, acrylic polymer (A2) may be copolymerized with a carboxyl group-containing monomer and a hydroxyl group-containing monomer to improve adhesiveness of an adhesive and impart stability to an emulsion. Examples of the carboxyl group-containing monomer include acrylic acid, methacrylic acid, carboxyethyl acrylate, carboxypentyl acrylate, itaconic acid, maleic acid, fumaric acid, crotonic acid and the like. Examples of the hydroxyl group-containing monomer include hydroxybutyl (meth)acrylate, hydroxyhexyl (meth)acrylate, hydroxyoctyl (meth)acrylate, hydroxydecyl (meth)acrylate, hydroxylauryl (meth)acrylate, (4-hydroxymethylcyclohexyl)methyl methacrylate and the like. The carboxyl group-containing monomer and/or hydroxyl group-containing monomer are/is preferably contained in an amount of 0.1-8 wt %, more preferably 1-7 wt %, further preferably 2-5 wt %, of all monomer components constituting acrylic polymer (A2).

Acrylic polymer (A2) preferably contains butyl acrylate (BA) and methyl methacrylate (MMA) as monomer components. The "MMA ratio (%)", which is a ratio (N/M) of the weight (N) of methyl methacrylate (MMA) to the weight (M) of butyl acrylate (BA) in acrylic polymer (A2), can be changed according to the adherend to which the adhesive sheet is applied, constituent material of the adhesive layer 21 and the like. It is preferably not more than 100%, more preferably 40-80%.

In addition, "core-shell ratio (%)", which is a ratio (L/K) of the weight (L) of the core 31 to the weight (K) of the shell 32 in the core-shell structure polymer particles, is preferably not more than 100%, more preferably 20-80%.

The detail of the weight ratio of shell 32 and core 31 and core-shell structure of the core-shell structure polymer particles can be analyzed by, for example, DSC measurement and TEM (3D-TEM) method.

The polymer emulsion from which the polymer particle group composed of core-shell structure polymer particles and polymer particle group composed of non-core-shell structure polymer particles are derived can be obtained by emulsion polymerization, that is, by polymerizing a monomer emulsion.

<Emulsion Polymerization>

Emulsion polymerization to obtain a polymer emulsion from which the polymer particle group composed of non-core-shell structure polymer particles is derived can be performed by a conventional method. That is, an emulsifier (surfactant), a radical polymerization initiator and, where necessary, a chain transfer agent and the like are appropriately blended with the aforementioned monomer and emulsion polymerization is performed by a known emulsion polymerization method such as a batch charge method (batch polymerization method), a monomer dropping method, a monomer emulsion dropping method and the like. In the monomer dropping method, continuous dropping or split dropping is appropriately selected. Known emulsion polymerization methods can be appropriately combined. The reaction conditions and the like can be appropriately selected. The polymerization temperature is preferably, for example, about 40-95° C., and the polymerization time is preferably about 30 min-24 hr.

Emulsion polymerization to obtain a polymer emulsion from which the polymer particle group composed of core-shell structure polymer particles is derived can be performed by multi-stage emulsion polymerization including emulsion polymerization to form a polymer to be the core of the core-shell structure polymer particles, and emulsion polymerization to form a polymer to be the shell in the presence of the resulting polymer to be the core. Each emulsion polymerization can be performed by a conventional method and the aforementioned method and conditions can be adopted.

As one embodiment, a production example of cohesive particles with core-shell ratio of 50% and MMA ratio of 50% (polymer particle group composed of core-shell structure polymer particles) is shown below.

Firstly, to obtain a core 31 of core-shell structure polymer particles, a mixture of LATEMUL E-118B as a surfactant (manufactured by Kao Corporation) (3 parts by weight) and ion exchange water (205 parts by weight) relative to butyl acrylate (BA) (100 parts by weight) was prepared in a container as a starting material and agitated in a homomixer (manufactured by Tokushu Kika Kogyo Co., Ltd.) at 6000 rpm under a nitrogen atmosphere for 5 min to give a monomer emulsion A.

Then, to obtain a shell of core-shell structure polymer particles, a mixture of methyl methacrylate (MMA) (50 parts by weight), LATEMUL E-118B (1 part by weight) and ion exchange water (87.5 parts) relative to butyl acrylate (BA) (50 parts by weight) was prepared in another container as a starting material and agitated in a homomixer at 6000 rpm under a nitrogen atmosphere for 5 min to give a monomer emulsion B.

Thereafter, the total amount of the prepared monomer emulsion A was charged in a reaction container equipped with a cooling tube, a nitrogen inlet tube, a thermometer, a dropwise addition facility, and stirring blades, the reaction container was sufficiently substituted with nitrogen with stirring, and the reaction mixture was heated to 60° C. V-50 (manufactured by Wako Pure Chemical Industries, Ltd.) (0.1 part by weight relative to 50 parts by weight of butyl acrylate (BA)) as a water-soluble azo polymerization initiator was added and the mixture was polymerized for 2 hr while keeping at 60° C. to give a copolymer to be the core layer. Then, V-50 (0.5 parts by weight relative to 50 parts by weight of butyl acrylate (BA)) alone was further added, the above-mentioned monomer emulsion B was added dropwise over 2.5 hr while keeping at 60° C. to form a shell, whereby a water dispersion liquid containing core-shell structure polymer particles with solid content concentration of 40% was obtained. The obtained core-shell structure polymer particles had an average particle size of 160 nm.

When convex part 22 is formed from plural cohesive particles 30, for example, a method including adding dropwise a polymer emulsion (emulsion liquid) on the surface of the adhesive layer 21 with a dispenser, a method including transcribing a polymer emulsion (emulsion liquid) on the surface of the adhesive layer 21 with a gravure roll having an engraved pattern corresponding to the pattern of the convex parts 22, a method including printing a polymer emulsion (emulsion liquid) by using a general printing technique such as screen printing, offset printing, flexo printing and the like and the like can be mentioned. Individual particles in a plurality of cohesive particles are substantially spherical before they form aggregates of particles. The average particle size of plural cohesive particles is preferably not less than 100 nm, more preferably not less than 120 nm, from the aspect of viscosity of polymer emulsion (water dispersion liquid). On the other hand, it is preferably not more than 300 nm, more preferably not more than 200 nm, from the aspect of cohesiveness of the polymer particles after drying the polymer emulsion (water dispersion liquid).

The maximum diameter (symbol A in FIG. 11) of the convex part 22 formed from plural cohesive particles 30 is preferably not less than 100 nm, more preferably not less than 250 nm, from the aspects of shape stability of the convex part. It is preferably not more than 3 mm, more preferably not more than 2 mm, for expression of a sufficient adhesive force after pressurization adhesion. The height (symbol B in FIG. 11) of the convex part 22 is preferably not less than 1 μm, more preferably not less than 10 μm, from the aspect of the stability of the position adjustment function of the adhesive sheet 10, and preferably not more than 200 μm, more preferably not more than 100 μm, particularly preferably not more than 80 μm, from the aspect of the adhesiveness and adhesive force of the adhesive sheet.

<Measurement of Average Particle Size>

The average particle size of plural cohesive particles is measured by the following method. One cycle of processing wherein several cohesive particles are extracted randomly from plural cohesive particles forming certain one convex parts 22, the diameter of each cohesive particle is measured by a laser diffraction scattering method, and a value positioned at the center of the diameter of the measured several cohesive particles is adopted (namely, evaluated by median diameter) is repeated several times to give several median diameters. The mean thereof is taken as the average particle size.

As another preferable embodiment of the low-adhesive convex part 22, a convex part composed of a porous screen can be mentioned. In the present invention, a porous screen refers to a porous sheet (or having pores). The porous screen also includes a net.

While specific examples of the porous screen are not particularly limited, for example, plastic net, fiber net, metal thread net and the like can be mentioned. Also, for example, plastic sheet, thin leaf metal sheet, woven fabric, non-woven fabric, paper and the like that underwent a perforation treatment and the like can be mentioned.

The shape of the pore or mesh of a porous screen is not particularly limited as long as it exhibits the above-mentioned property and, for example, triangle, rectangle (e.g., square, rectangle, diamond, trapezoid etc.), circular shape (e.g., true circle, approximately true circle, ellipse etc.) and the like can be mentioned. It may be an indefinite shape similar to the aforementioned shape. The shape of the pore or mesh may be completely the same or different for each pore.

The thickness of the porous screen is not particularly limited as long as the above-mentioned property can be exhibited and is, for example, preferably 10-200 μm, more preferably 50-150 μm. When the thickness is less than 10 μm, the slip property may be degraded. On the other hand, when it exceeds 200 μm, adhesiveness and slip property may not be achieved simultaneously.

When the porous screen is a net, the material thereof is not particularly limited. Examples thereof include synthetic resin (plastic) such as nylon, polyethylene, polypropylene, polyester and the like, natural fiber, metal fiber and the like.

While the basis weight is not particularly limited, it is preferably 1.0-70 g/m$^2$, more preferably 2.0-20 g/m$^2$, since the adhesiveness and slip property are simultaneously achieved in the adhesive face to which a porous screen has been adhered.

The size of the mesh is not particularly limited. However, to simultaneously achieve adhesiveness and slip property of the adhesive face to which a porous screen has been adhered, 5/inch-50/inch is preferable, and 20/inch-40/inch is more preferable.

Examples of the commercially available product of such net include trade name "net ND20" manufactured by DAISEN Co., Ltd., and the like.

When the porous screen is a sheet having pores, the material thereof is not particularly limited. However, plastic and non-woven fabric are preferable for simultaneously achieving adhesiveness and slip property of the adhesive face to which a porous screen has been adhered.

The size of pores in a porous screen is not particularly limited as long as the above-mentioned property can be exhibited. The size of pores may be common or different for each pore. The size of such pore is about 500 μm-10 mm at the largest part of the pore.

The distribution of the pores in a porous screen is not particularly limited as long as the above-mentioned property can be exhibited. The pores may be concentrated in a certain area or may be dispersed as a whole.

The distance between pore parts of a porous screen is not particularly limited, and may be constant or may not be constant.

As other preferable embodiment of the low-adhesive convex part 22 of the present invention, a convex part made of solid particles can be mentioned.

Specific examples of the solid particles include inorganic solid particles such as calcium carbonate, barium carbonate, calcium sulfate, aluminum sulfate, molybdenum disulfide, titanium oxide, alumina, silica, magnesium oxide, calcium oxide, calcium hydroxide, ferrous oxide, ferric oxide, glass bead and the like; and organic solid particles such as hydrogenated rubber, ebonite, lignin/phenol resin, styrene resin, vinyl chloride resin, (meth)acrylic resin, polypropylene resin, polyethylene resin, melamine resin, urea resin, other resins and the like. One or more kinds of solid particles can be used.

As the solid particles, hollow solid particles can also be used as long as the hollow particle walls are not disrupted by the press pressure. Examples of such hollow solid particle include hollow solid particles free of disruption of hollow particle walls by the press pressure such as organic balloons such as urea resin balloon, melamine resin balloon, phenol resin balloon, polyvinylidene chloride balloon, epoxy resin balloon; inorganic balloons such as glass balloon, Shirasu balloon, carbon balloon, alumina balloon, silica sand balloon and the like. As used herein, "free of disruption" is used to mean that the gas in the hollow particles does not leak outside due to the breakage of even a part of the hollow particle wall.

The solid particles preferably have an average particle size of 1-100 μm. The average particle size of the solid particles can be measured by a laser diffraction•scattering method. To be specific, particle size distribution of inorganic filler is formed on a volume standard by a laser diffraction scattering particle size distribution analyzer, and the median diameter thereof is taken as the average particle size to be used for the measurement. As a measurement sample, solid particles dispersed in water by ultrasonication can be preferably used.

When the adhesive sheet 10 with the position adjustment function is a single-sided type adhesive sheet, it has, as shown in FIG. 5, a support 23 on a surface opposite to the surface on which the low-adhesive convex parts 22 of the adhesive layer 21 is provided. The support 23 is not particularly limited, and specific examples thereof include single films of polyester (e.g., poly(ethylene terephthalate) (PET) etc.), nylon, saran (trade name), polyvinyl chloride, polyethylene, polypropylene, ethylene-vinyl acetate copolymer, polytetrafluoroethylene, ionomer resin and the like, metal foil, a laminate film of two or more kinds of films selected therefrom and the like. To improve adhesiveness (anchor property) between a support and an adhesive layer, a laminate film of a non-porous film made of the above-mentioned material and the following porous film may be used as a support and an adhesive layer may be formed on the porous film side of the support.

Examples of the porous film include paper, woven fabric, non-woven fabric (e.g., polyester (e.g., poly(ethylene terephthalate) (PET) etc.) non-woven fabric etc.), films obtained by a mechanical perforation treatment of single films of the above-mentioned film (e.g., polyester (e.g., poly(ethylene terephthalate) (PET) etc.), nylon, saran (trade name), polyvinyl chloride, polyethylene, polypropylene, ethylene-vinyl acetate copolymer, polytetrafluoroethylene, ionomer resin and the like, metal foil, a laminate film of two or more kinds of films selected therefrom etc.), and the like, and paper, woven fabric, non-woven fabric (e.g., polyester non-woven fabric, poly(ethylene terephthalate) non-woven fabric etc.) are particularly preferable from the aspect of the flexibility of the support. In the case of a porous film, for example, woven fabric or non-woven fabric, the fabric weight is preferably set to 5-30 g/m$^2$ to improve anchor property.

The laminate film as the support is produced by a known production method of a laminate film such as heat lamination method, dry lamination method, wet lamination method, extrusion lamination method, hot-melt lamination, coextrusion lamination method and the like.

While the thickness of the support is not particularly limited, it is preferably 3-200 μm, more preferably 3-100 μm, from the aspect of broad utility for general use as an adhesive sheet.

The adhesive sheet 10 with the position adjustment function shows low friction due to the presence of the low-adhesive convex parts 22 on the surface of the adhesive layer 21, and can move smoothly on the surface of adherend 50 before adhesion. To freely move the adhesive sheet 10 on the surface of the adherend 50, the frictional force of the adhesive sheet 10 is preferably not more than 0.4 N/cm$^2$. When the frictional force exceeds 0.4 N/cm$^2$, position adjustment by sliding becomes difficult, and when it is not more than 0.4 N/cm², the position adjustment can be performed free of stress. The frictional force is that of the low-adhesive convex parts 22 in contact with the surface of the adherend. The measurement method of the frictional force is explained by reference to FIG. 13.

Figure 13:
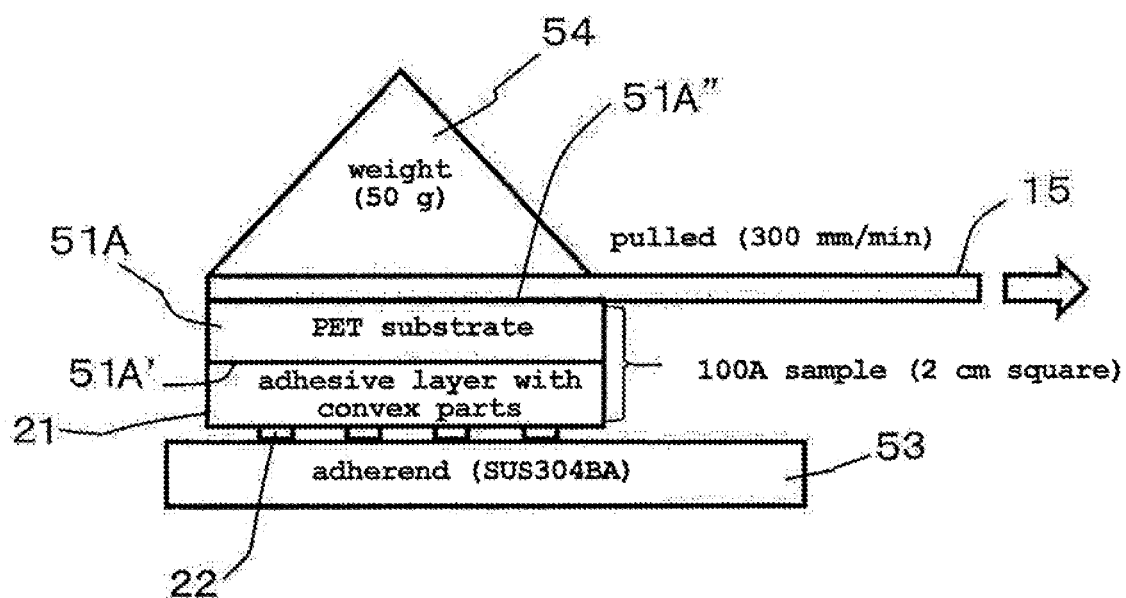
FIG. 13 is a drawing explaining a measurement method of the frictional force of the low-adhesive convex part.

In sample 100A as a measurement target in FIG. 13, an adhesive face on the side free of the convex parts 22 of the adhesive layer 21 with convex parts is adhered to one side 51A' of the PET substrate 51A. The sample 100A cut into 2 cm square is stood still on a stainless plate (SUS304BA, thickness: 400 μm, length 100 mm, width 30 mm, mass 9.5 g) 53 as an adherend such that the convex parts 22 contacts the plate. Then, 2 cm×10 cm PET substrate (guide) 15 is fixed on the sample 100A with a double-sided adhesive sheet (not shown). A weight 54 (50 g) is placed above the other surface 51A" of the PET substrate 51A such that a force is applied substantially equally to the entire sample 100A, weight 54 is fixed, sample 100A is pulled in the horizontal direction at a rate of 300 mm/min and the stress (N/cm²) applied at that time is measured and used as a frictional force. The weight 50 g of the weight 54 was determined from experience. The frictional force is an index for evaluating the position adjustment function of the adhesive sheet 1. When the position of the adhesive sheet 1 is adjusted, the user moves the adhesive sheet 1 on the surface of the adherend 50 while pressing the adhesive sheet 1 against the surface (adherend surface) of the adherend 50 with a predetermined force. Assuming that the pressure applied to the adherend 3 from the adhesive sheet 1 when the user operates the side of the other surface of the adhesive sheet 1 is about 12.5 g/cm², and the value 50 g was obtained by back calculation from this value. The weight 50 g presupposes that the weight of sample 51A does not substantially affect the stainless plate 53. For example, when a support other than the PET substrate is used and the weight thereof substantially affects the stainless plate 53, such weight is of course subtracted from 50 g.

The separator of the present invention can be used not only for the adhesive sheet provided with the position adjustment function as explained above but also as a separator for an adhesive sheet for general purposes, which is free of the low-adhesive convex part on the surface of the adhesive layer.

EXAMPLES

The present invention is explained in more detail in the following by referring to Examples and Comparative Examples. The present invention is not limited by the following Examples, and it is of course possible to practice with appropriate modifications within the range compatible with the above-mentioned and the following gist, all of which are encompassed in the technical scope of the present invention.

Example 1

On a non-crosslinked polyethylene foam film ("Esanon" manufactured by Sakai Chemical, foam layer thickness: 0.5 mm, apparent density: 34 kg/m³) was laminated a high density polyethylene film (solid film with thickness 10 μm) that was release-treated (release layer thickness: 1 μm) on one side with a cationically polymerizable UV-curable silicone release agent (UV-curable silicone TPR6500 manufactured by Momentive Co., Ltd.), by placing, on the foam film, the surface opposite to the release-treated surface, whereby a separator with a two-layer structure was produced.

Example 2

On a non-crosslinked polyethylene foam film ("Esanon" manufactured by Sakai Chemical, foam layer thickness: 1.0 mm, apparent density: 34 kg/m³) was laminated a high density polyethylene film (solid film with thickness 10 μm) that was release-treated (release layer thickness: 1 μm) on one side with a cationically polymerizable UV-curable silicone release agent (UV-curable silicone TPR6500 manufactured by Momentive Co., Ltd.), by placing, on the foam film, the surface opposite to the release-treated surface, whereby a separator with a two-layer structure was produced.

Example 3

On a non-crosslinked polyethylene foam film ("Esanon" manufactured by Sakai Chemical, foam layer thickness: 1.0 mm, apparent density: 34 kg/m³) was laminated a low density polyethylene film (solid film with thickness 50 μm) that was release-treated (release layer thickness: 1 μm) on one side with a cationically polymerizable UV-curable silicone release agent (UV-curable silicone TPR6500 manufactured by Momentive Co., Ltd.), by placing, on the foam film, the surface opposite to the release-treated surface, whereby a separator with a two-layer structure was produced.

Example 4

On a non-crosslinked polyethylene foam film ("Esanon" manufactured by Sakai Chemical, foam layer thickness: 0.5 mm, apparent density: 34 kg/m³) was laminated a low density polyethylene film (solid film with thickness 10 μm) that was release-treated (release layer thickness: 1 μm) on one side with a cationically polymerizable UV-curable silicone release agent (UV-curable silicone TPR6500 manufactured by Momentive Co., Ltd.), by placing, on the foam film, the surface opposite to the release-treated surface, whereby a separator with a two-layer structure was produced.

Comparative Example 1

One side of a non-crosslinked polyethylene foam film ("Esanon" manufactured by Sakai Chemical, foam layer thickness: 0.5 mm, apparent density: 34 kg/m³) was release-treated (release layer thickness: 1 μm) with a cationically polymerizable UV-curable silicone release agent (UV-curable silicone TPR6500 manufactured by Momentive Co., Ltd.) to produce a separator.

Comparative Example 2

On both sides of a non-crosslinked polyethylene foam film ("Esanon" manufactured by Sakai Chemical, foam layer thickness: 0.5 mm, apparent density: 34 kg/m³) were each laminated a low density polyethylene film (solid film with thickness 50 μm) that was release-treated (release layer thickness: 1 μm) on one side with a cationically polymerizable UV-curable silicone release agent (UV-curable silicone TPR6500 manufactured by Momentive Co., Ltd.), by placing, on the foam film, the surface opposite to the release-treated surface, whereby a separator was produced.

The tensile property and compress property of the separators produced in the Examples and Comparative Examples were measured by the following methods.

1. Strain

Under 23° C., 50% RH atmosphere, rectangle strip test piece of width 20 mm, length 50 mm was subjected to a tension test by a tension tester (compact desktop tester EZtest by Shimadzu Corporation) under conditions of distance between chucks 50 mm, pulling speed 10 mm/min. After reaching load 5N, load 5N was held and strain one minute later was calculated.

device: Autograph (compact desktop tester EZtest by Shimadzu Corporation)
    test piece: width 20 mm, length 50 mm
    pulling condition: held after reaching 5N at speed 10 mm/min 2. Apparent Elastic Modulus of Divided Separator The substrate (non-crosslinked polyethylene foam film) of the obtained separator was cut in half in the thickness direction thereof. That is, using razor (manufactured by GEM: single-edged trimming razor), the separator was divided into two by cutting the substrate (non-crosslinked polyethylene foam film) into two films of approximately half the thickness of the substrate. A test piece of width 10 mm, length 50 mm was cut out from each of the obtained two divided separators (first divided separator and the second divided separator), and subjected to a tension test under 23° C., 50% RH atmosphere under conditions of distance between chucks 50 mm, pulling speed 10 mm/min using Autograph (compact desktop tester EZtest by Shimadzu Corporation). A stress-strain curve at that time was obtained, and the elastic modulus (apparent elastic modulus) was calculated from the slope of the curve immediately after starting pulling (strain 1%) in the stress-strain curve.

device: Autograph (compact desktop tester EZtest by Shimadzu Corporation)
    test piece: width 10 mm, length 50 mm
    pulling condition: speed 10 mm/min (strain speed 16%/min)

3. Compressive Elastic Modulus of Separator

A compression test using an autograph (compact desktop tester EXtest manufactured by Shimadzu Corporation) was performed.

A separator (4 cm×4 cm) was placed on a table (made of SUS) with the surface opposite to the surface subjected to a release treatment facing the table, and a cylindrical indenter (made of SUS) was pressed against the center portion of the separator (4 cm×4 cm) from a direction perpendicular to the release treatment surface and the compressive stress was measured (temperature: 23° C., indenter area: 1 cm², compression rate: 1 mm/min).

The fracture resistance and wrinkle resistance of the release layer of the separators produced in the Examples and Comparative Examples were evaluated by the following methods.

4. Fracture Resistance of Release Layer (1) A release-treated surface (release layer) of the separator was adhered to a double-sided adhesive tape (TW-Y01) manufactured by Nitto Denko Corporation, and preserved under 23° C., 50% RH atmosphere for one day. A test piece 1 of width 50 mm, length 150 mm was cut out therefrom. (2) A release-treated surface (release layer) of the separator was adhered to a double-sided adhesive tape (TW-Y01) manufactured by Nitto Denko Corporation, and preserved under 60° C.-normal humidity for 5 days. A test piece 2 of width 50 mm, length 150 mm was cut out therefrom. The 180° peel strength of the two test pieces was measured under the following conditions. The "normal humidity" is within the range of relative humidity 45-85% (45-85% RH).

device: TG-1 kN (manufactured by Minebea)
    test piece: width 50 mm, length 150 mm
    peel conditions (peel angle: 180°, speed: 300 mm/min)

The fracture resistance of the release layer was evaluated according to the following criteria.

When the release force is not less than 1N/20 mm or the release force of test piece 2 (preserved for 5 days under 60° C.-normal humidity) increased to not less than twice the release force of test piece 1 (preserved for 1 day under room temperature-normal humidity), the release layer was judged to have been destructed (failure: x) and when none of these apply, the fracture resistance of the release layer was judged to be fine (pass: ○).

5. Wrinkle Resistance

A roll was produced by winding a separator by 1 m around a core with an outer diameter of 3 inches at winding tension 50 N/30 mm, winding speed 1 m/min. After production of the roll, the roll was preserved for not less than 1 hr, the separator was fed out, and the number of wrinkles in the direction perpendicular to the machine direction was counted. The wrinkles counted were those having a width of not less than 2 mm and a depth of not less than 200 μm, and the range where counting was performed was 200 mm in the flow direction and 300 mm in the width direction.

The number of wrinkles was evaluated as 0: excellent (⊙), 1: good (○), 2: acceptable (Δ), 3 or more: not good (x).

The physical properties, characteristics and evaluation results of Examples and Comparative Examples are shown in Table 1.

TABLE 1

| | tensile property | | compression property | apparent density | fracture resistance of release layer | | | | |
| | apparent elastic modulus [MPa] | | compressive elastic modulus [MPa] | [kg/m³] of porous film used for substrate | peeling force [N/20 mm] | | | | wrinkle resistance |
| strain [%] | first divided separator | second divided separator | | | after preservation for one day under room temperature, normal humidity | after preservation for 5 days under 60° C., normal humidity | evaluation | n | evaluation |
|---|---|---|---|---|---|---|---|---|---|
| Ex. 1 | 4 | 22.4 | 7.65 | 0.03 | 34 | 0.53 | 0.5 | ○ | 0 | ⊙ |
| Ex. 2 | 3 | 11.3 | 1.55 | 0.03 | 34 | 0.27 | 0.25 | ○ | 0 | ⊙ |
| Ex. 3 | 4 | 20.9 | 1.55 | 0.027 | 34 | 0.24 | 0.26 | ○ | 1 | ○ |
| Ex. 4 | 2 | 2.3 | 1.6 | 0.027 | 34 | 0.27 | 0.25 | ○ | 2 | Δ |
| Comp. Ex. 1 | 8 | 7.7 | 7.65 | 0.02 | 34 | 0.23 | 1.15 | X | 0 | ⊙ |
| Com. Ex. 2 | 2 | 20.9 | 20.86 | 0.027 | 34 | 0.24 | 0.26 | ○ | 9 | X |

EXPLANATION OF SYMBOLS 1 separator
1A, 1B divided separators
2 substrate
2a, 2b films of approximately half the thickness of substrate
2A main layer
2B thin layer
3 release layer
10 adhesive sheet provided with position adjustment function
21 adhesive layer
22 low-adhesive convex part
23 support This application is based on a patent application No. 2016-204641 filed in Japan, the contents of which are incorporated in full herein.

The invention claimed is:

1. A separator comprising a substrate and a release layer, wherein
    the separator shows a strain of not more than 7% when a load of 5N/20 mm is applied for one minute in a pulling direction,
    when the substrate is cut in half in the thickness direction to divide the separator into two, an apparent elastic modulus (E1) in the pulling direction of one of the divided separators is larger than an apparent elastic modulus (E2) in the pulling direction of the other divided separator, and the release layer is included in the divided separator having the elastic modulus (E1), the separator satisfies $E1 \geq 1.4 \times E2$,
    the substrate comprises:
        a porous film; and
        a solid film laminated on one side of the porous film,
    the release layer is formed on the solid film,
    the porous film is a polyolefin foam,
    the solid film is a polyolefin film, and
    the release layer is formed from a silicone release agent.

2. The separator according to claim 1, wherein the porous film has a density of 10-200 kg/m$^3$.

3. The separator according to claim 1, wherein the compressive elastic modulus of the separator is not more than 1 MPa.

4. The separator according to claim 1, which is for an adhesive sheet provided with a position adjustment function and comprising an adhesive layer and a low-adhesive convex part partially formed on a surface of the adhesive layer.

5. The separator according to claim 1, wherein the porous film is a polyethylene foam and the solid film is a polyethylene film.

* * * * *